United States Patent [19]

Tanaka et al.

[11] Patent Number: 4,979,331
[45] Date of Patent: Dec. 25, 1990

[54] HOTHOUSE FOR CULTIVATION

[75] Inventors: Yoshiaki Tanaka; Hiroshi Kobayashi; Kiyoshi Isokawa; Kazunobu Fukano; Yoshitsugu Utsumi; Shin-ichi Kadowaki, all of Tokyo, Japan

[73] Assignee: Sanwa Shutter Corporation, Tokyo, Japan

[21] Appl. No.: 116,383

[22] Filed: Nov. 3, 1987

[30] Foreign Application Priority Data

| Nov. 7, 1986 | [JP] | Japan | 61-265171 |
| Nov. 7, 1986 | [JP] | Japan | 61-265172 |
| Nov. 7, 1986 | [JP] | Japan | 61-265173 |
| Nov. 7, 1986 | [JP] | Japan | 61-265174 |
| Nov. 7, 1986 | [JP] | Japan | 61-265175 |
| Nov. 7, 1986 | [JP] | Japan | 61-265176 |
| Nov. 7, 1986 | [JP] | Japan | 61-265177 |
| Nov. 7, 1986 | [JP] | Japan | 61-265178 |
| Nov. 7, 1986 | [JP] | Japan | 61-265179 |
| Nov. 7, 1986 | [JP] | Japan | 61-265180 |
| Nov. 7, 1986 | [JP] | Japan | 61-265181 |
| Nov. 7, 1986 | [JP] | Japan | 61-265182 |
| Dec. 22, 1986 | [JP] | Japan | 61-305919 |
| Dec. 22, 1986 | [JP] | Japan | 61-305920 |
| Dec. 22, 1986 | [JP] | Japan | 61-305921 |
| Apr. 22, 1987 | [JP] | Japan | 62-99130 |
| May 20, 1987 | [JP] | Japan | 62-123534 |
| May 20, 1987 | [JP] | Japan | 62-123535 |

[51] Int. Cl.$^5$ .......................................... A01G 9/00
[52] U.S. Cl. ........................................ 47/17; 160/32
[58] Field of Search ............................. 47/17; 160/32

[56] References Cited

U.S. PATENT DOCUMENTS 4,242,833 1/1981 Maes, Jr.
4,565,230 1/1986 Van Rijn et al. ..................... 47/17

FOREIGN PATENT DOCUMENTS

| 124456 | 11/1984 | European Pat. Off. | 47/17 |
| 145508 | 6/1985 | European Pat. Off. | 47/17 |
| 1911301 | 9/1970 | Fed. Rep. of Germany | 47/17 |
| 2756475 | 6/1979 | Fed. Rep. of Germany | 47/17 |
| 2805848 | 8/1979 | Fed. Rep. of Germany | 47/17 |
| 2391641 | 1/1979 | France | 47/17 |
| 244783 | 10/1969 | U.S.S.R. | 47/17 |
| 985634 | 12/1982 | U.S.S.R. | 47/17 |
| 446247 | 7/1934 | United Kingdom . |
| 931468 | 7/1963 | United Kingdom . |
| 2001374A | 1/1979 | United Kingdom . |

Primary Examiner—Harold J. Tudor
Assistant Examiner—Richard W. Wendtland
Attorney, Agent, or Firm—Ladas & Parry

[57] ABSTRACT

The hothouse for cultivation according to the present invention relates especially to a hothouse for cultivation enclosed with transparent members, wherein reflexion plates are provided on the northern side for reflecting the sunlight toward the soil surface inside the hothouse, and also to a hothouse enclosed with transparent members, wherein the hothouse comprises a shutter which can be opened and closed freely, and is switchable between two types of hothouses which are a hothouse composed only of the transparent members and a double hothouse comprising a heat insulation space between the shutter completely closed and the transparent members, so that the heat of the sunlight received by the hothouse for cultivation is most effectively used and kept in the hothouse. The hothouse for cultivation of the present invention further comprises ventilation apparatus, drainage, temperature control installations, and a flowerpot device for improving the performance of the basic inventions, and proposes details for such installations from the point of view of a variety of technologies. One can think of many applications and combination based on the disclosure of the preferred embodiments within the spirits and scope of the present invention.

27 Claims, 28 Drawing Sheets

HOTHOUSE FOR CULTIVATION

FIELD OF THE INVENTION

The present invention relates to hothouses for cultivation in which plants such as vegetables, fruits and flowers are grown and cultivated and more specifically to hothouses with a suitable structure comprising installations for increasing the reception rate of the sunlight as a hothouse and installations for controlling the inside temperature of the hothouses.

BACKGROUND ART

Generally, this type of hothouses for cultivation are enclosed with transparent films or glass plates for maintaining the inside temperature higher than the outside temperature so that plants can grow even in cold seasons as in winter when outdoor raising is impossible or plants can be raised quickly by forcing culture. However, in the northern hemisphere as in Japan, when plants are cultivated in a plurality of rows which are arranged from south to north, although the plants on the southern side receive the sunlight directly, those on the northern side which are hidden by those on the southern side are shone for shorter period and receive substantially less sunlight In summer, when the angle of elevation of the sun is large and the sunlight is strong, there is practically no problem. On the contrary, in winter when the shining hours are short and the angle of elevation is small, it is difficult to assure sufficient sunshine to the plants on the northern side, thereby the plants on the northern side grow so slower than those on the southern side as to make a delay of harvest-time or even to become sterile because of bad growth. Thus, a hothouse was developped in which the roof surface is inclined toward the southern side and the soil surface is shaped as steps with the northern side higher than the southern side so that the plants on the northern side receive sufficient sunshine. This type of hothouse presents problems because it is difficult or even impossible to construct such a hothouse on a flat horizontal surface although it can be realized relatively easily on a special surface configuration such as on a mountainside. There are apparently many hothouses in which mechanical installations for temperature control are provided. However, this results in an additional expense for such installations as well as great operation and maintenance cost. There are also hothouses in which the roof is covered by a sunshade sheet. However, this type of hothouses are not effective to the maintenance of temperature because the sunshine shade is for protecting the plants from withering against strong sunshine.

The present invention was accomplished in view of avoiding the above-mentioned drawbacks to provide a hothouse composed of transparent enclosing members wherein reflexion plates are provided on the northern side for reflecting the sunlight toward the soil surface inside the hothouse. With this construction, the plants on the northern side are provided with sufficient sunlight.

Another object of the present invention is to provide a hothouse wherein a shutter is provided which can be opened or closed along the transparent roof for preventing the temperature fall in the hothouse by providing a heat insulation air space between the roof and the shutter. The present invention also aims at providing an effective structure of the shutter for the heat insulation structure.

Another object of the present invention is to provide a hothouse comprising drainage for guiding condensed water drops so that they do not fall in the hothouse, the water drops being created on the roof surface, in particular on the lower surface of the shutter when it is closed because the respiration of the plants and the action of the installations for air mixing cause the difference of temperature between the inside high temperature of the hothouse and the outside low temperature.

Another object of the present invention is to provide a hothouse wherein ventilation control can be realized, as a result of considerations on the operation control of the shutter and on the construction of the hothouse as a structure.

Another object of the present invention is to provide a hothouse comprising active mechanical temperature control installations for maintaining appropriately the inside temperature of the hothouse, the installations being mainly composed of an air mixing apparatus which is especially effective when the shutter is closed.

Another object of the present invention is to provide a hothouse comprising, as temperature control installations, a duct work for hot water under the ground for maintaining appropriately the inside temperature of the hothouse, hot water then circulating in the duct work for heating effectively the inside of the hothouse.

A further object of the present invention is to provide a hothouse comprising, as temperature control installations, water sprinklers on the roof for preventing snow to lie or for promoting snow to melt so that the hothouse can be used even in winter.

A further object of the present invention is to provide a hothouse being adapted for each of the objects mentioned above based on further considerations on the details of the structure of the shutter to be used for a hothouse.

A further and not the last object of the present invention is to provide a hothouse comprising an improved flowerpot for cultivation suitable for use in the hothouse.

DISCLOSURE OF INVENTION

The basic idea of the present invention is to supply sufficient sunshine to even the plants positioned on the northern side in a hothouse. The hothouse for cultivation according to the present invention is a hothouse enclosed with transparent members wherein reflexion plates are provided on the northern side for reflecting the sunlight toward the soil surface inside the hothouse.

Next, the second hothouse for cultivation according to the basic idea of the present invention is a hothouse enclosed with transparent members wherein a shutter which can be opened and closed freely is provided on the top of the hothouse so that the hothouse is switchable between two types of hothouses which are a hothouse composed only of the transparent members and a double hothouse comprising a heat insulation space between the shutter completely closed and the transparent members. The shutter can be evidently equipped to the first basic hothouse comprising reflexion plates.

The third characteristic of the present invention is a hothouse enclosed with transparent members and comprising a shutter which can be opened and closed freely, the hothouse being switchable between two types of hothouses which are a hothouse composed only of the transparent members and a double hothouse comprising a heat insulation space between the shutter completely closed and the transparent members, wherein the hothouse comprises drainage for draining condensed water drops in the hothouse, the drainage being realized by spreading the shutter with its ceiling portion slightly inclined so that its surface faces to the south, by providing each slat which constitutes the shutter curtain with a water receiving drain at the lateral side on the surface facing to the inside of the hothouse, and by extending the drain toward a conduit along a guide rail.

The fourth aspect of the invention relates to a hothouse enclosed with transparent members and comprising a shutter which can be opened and closed freely so that the hothouse are switchable between two types of hothouses which are a hothouse composed only of the transparent members and a double hothouse comprising a heat insulation space between the shutter completely closed and the transparent members, wherein temperature control installations are provided for assuring sufficient sunshine to the plants and for maintaining the inside temperature of the hothouse.

The fifth aspect of the invention relates to a hothouse comprising inside thereof an improved flowerpot means for cultivation suitable for using inside of the hothouse.

Other features of the present invention will be understood in the following description referring to the drawings on the embodiments.

BEST MODE OF CARRYING OUT THE INVENTION

Figure 1:
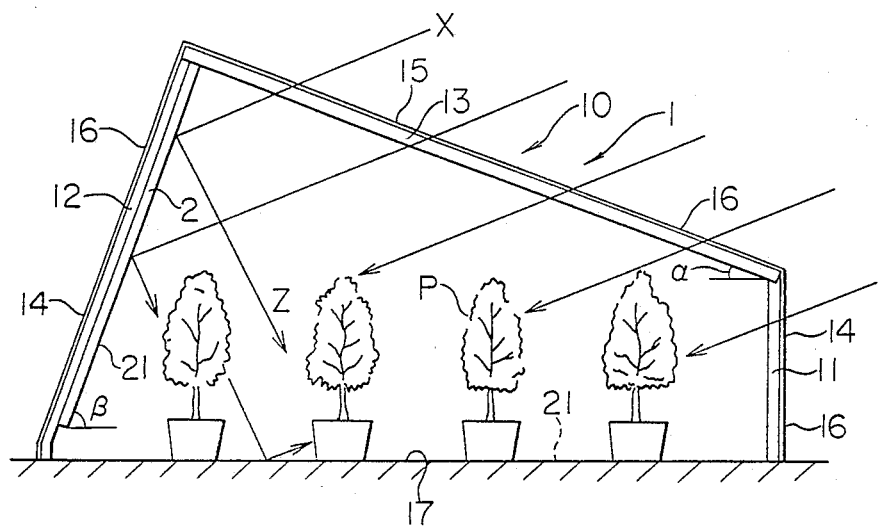
FIG. 1 is a schematic cross-sectional view showing the whole of a hothouse according to the present invention.

The structure of a hothouse for cultivation according to the present invention is explained in detail referring to preferable embodiments. In FIG. 1, reference number 1 represents the whole of a hothouse for cultivation and 10 is a structure of the hothouse (which is referred to simply as a hothouse hereinafter). The hothouse 10 is a prefabricated structure which is constructed with section steels extending from the east to the west and a single span beam extending from the south to the north, the side from the east to the west being longer than that from the south to the north. A beam 13 extends between a post on the southern side 11 and a post on the northern side 12, and a sheet 16 is spread over the external wall 14 and the roof 15 through auxiliary members such as furring strips, wings and rafers. In the hothouse 10 of the hothouse for cultivation 1, the post on the southern side 10 is vertical and its eaves is low, while the post on the northern side 12 which has a high eaves is inclined toward the inside of the hothouse, thereby the roof 15 is going upward on the northern side with the angle of inclination α. The sheet 16 is a transparent resin film, for example made of polyethylene. The angle of inclination need not to be so large as condensed water on the lower side of the sheet 16 falls, but the angle of inclination α is chosen so that the water flows along the surface by its water-repellent effect. In the present invention, the angle of inclination $\alpha$ is 20 degrees. The angle of inclination of the external wall on the northern side 14 is $\beta$. A reflexion plate 2 is attached to its inside surface. The inside surface of the reflexion plate 2 is provided with reflectors 21, for example, aluminum foils which constitute a reflexion surface. The floor 17 of the hothouse 10 is in general the soil itself, but reflectors 21 can be spread over its surface. P represents plants for cultivation, which can be planted directly into the soil or, as shown in the drawing, in a flowerpot.

Figure 2:
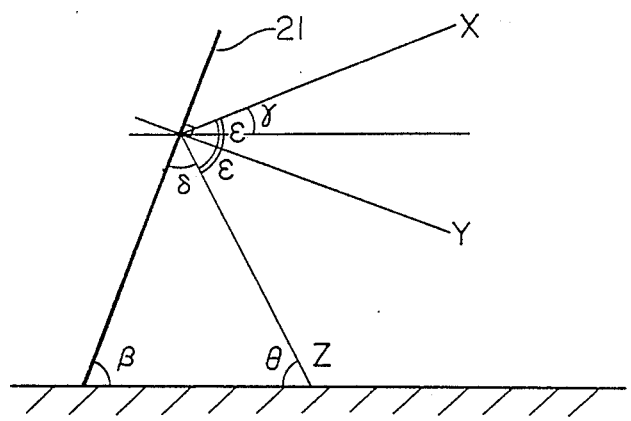
FIG. 2 is a diagram explaining the relation between the angle of elevation of the sun and the angle of reflextion on the wall surface of the northern side.

When the roof 15 of this hothouse 10 receives the sunshine X, most of the sunlight transmits the sheet 16 and penetrates into the inside of the hothouse 10. The transmitted light which arrives at the reflectors 21 is reflected to irradiate the inside of the hothouse 10 from upward of the northern side. The relation bewtween the incidence light X and the reflected light Z is explained referring to FIG. 2. The angle $\gamma$ is the angle of incidence of the sunlight, which is given as the angle of elevation of the sun at various places at various time of the year. For example in Hokkaido in Japan, the angle of incidence at noon in winter is 22 degres and the maximum angle of elevation of the sun is 70 degrees in summer. The angle $\delta$ is the angle toward the bottom between the reflected light Z and the reflectors 21. The angle $\epsilon$ is the angle between the normal line Y of the reflectors 21 and the incidence light X or the reflected light Z. If we calculate the angle of irradiation $\theta$ of the reflected light Z not only taking into account these relations and the minimum value of the angle $\gamma$, that is 22 degrees but also paying attention so that the shadow is not formed on the floor surface by making the angle $\beta$ smaller than 70 degrees, the angle of irradiation $\theta$ is given as 62 degrees. In this case, sufficient sunlight for raising the plants P can be obtained from the northern side.

Figure 3:
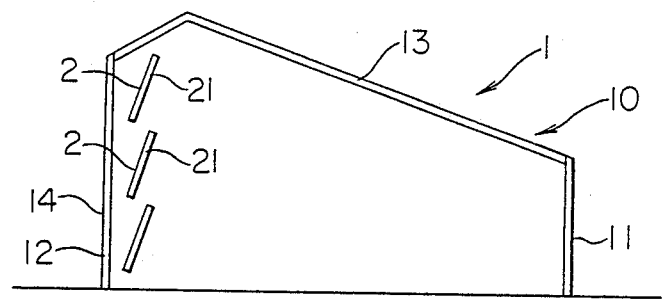
FIG. 3 is a cross-sectional view of a hothouse for cultivation comprising another type of reflexion surface.
Figure 4:
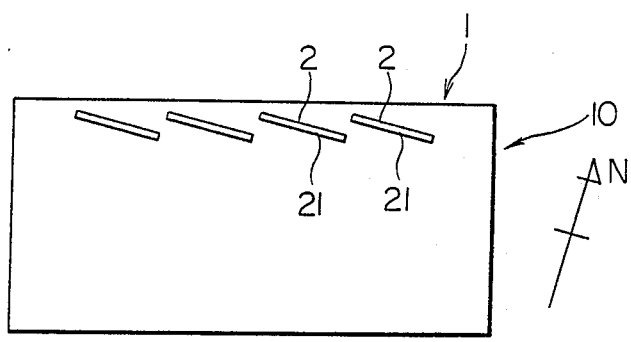
FIG. 4 is a plan of a hothouse for cultivation comprising another type of reflexion surface.

Next, other embodiments of the reflexion plate 2 are explained referring to FIGS. 3 and 4. FIG. 3 is a cross-sectional view of another hothouse 10 in which the ridge is not positioned at the center and the post on the northern side 12 and the wall 14 are vertical. Only the reflexion plate 2 is supported with certain inclination on the wall. In this case, the reflexion plate 2 is divided into several pieces and attached separately from up to down so that each piece of reflection plate 2 constitutes a reflector 21. FIG. 4 is a plan of another hothouse 10 in which the front surface does not directly face to the south. In this case, the reflection plate 2 is divided into several pieces along the longitudinal direction so that each one faces to the south for constituting a reflector 21.

In this way, in the hothouse 10 of the hothouse for cultivation 1 according to the present invention, effective sunlight can be obtained only by arranging the reflection plate 2 with a certain inclination.

Figure 5:
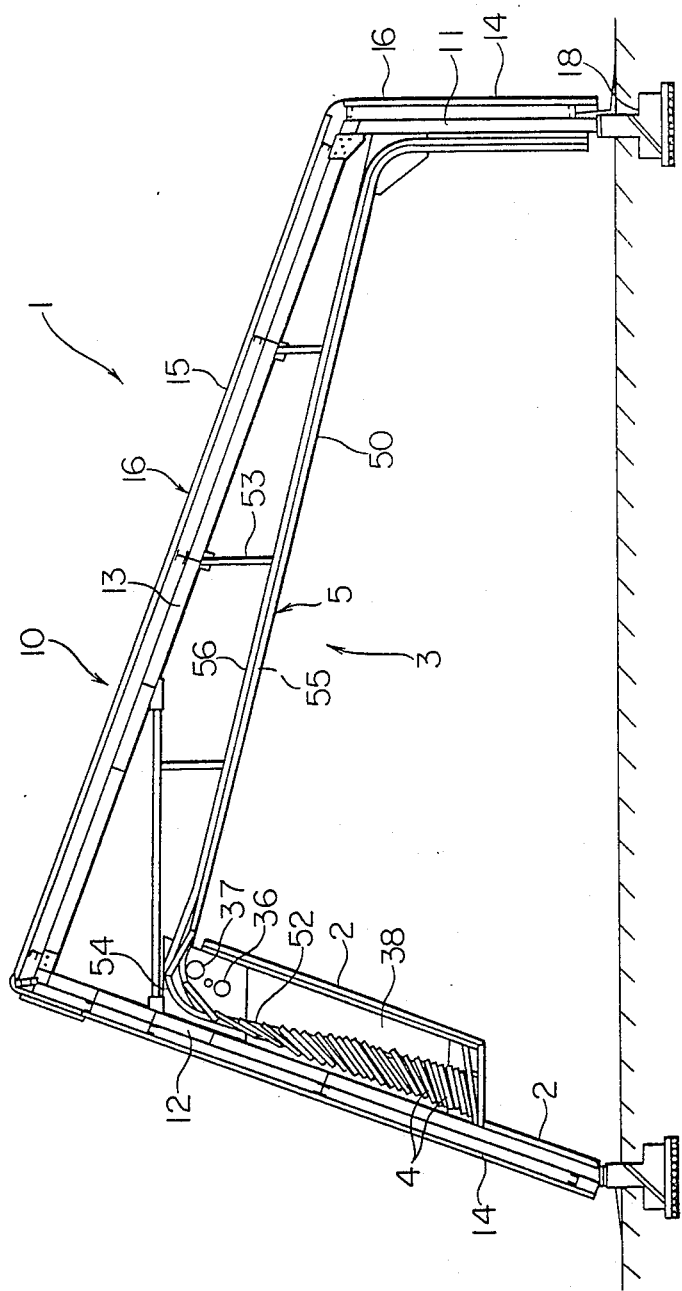
FIG. 5 is a cross-sectional view showing a heat insulation structure at the roof when the sutter is entirely opened.
Figure 6:
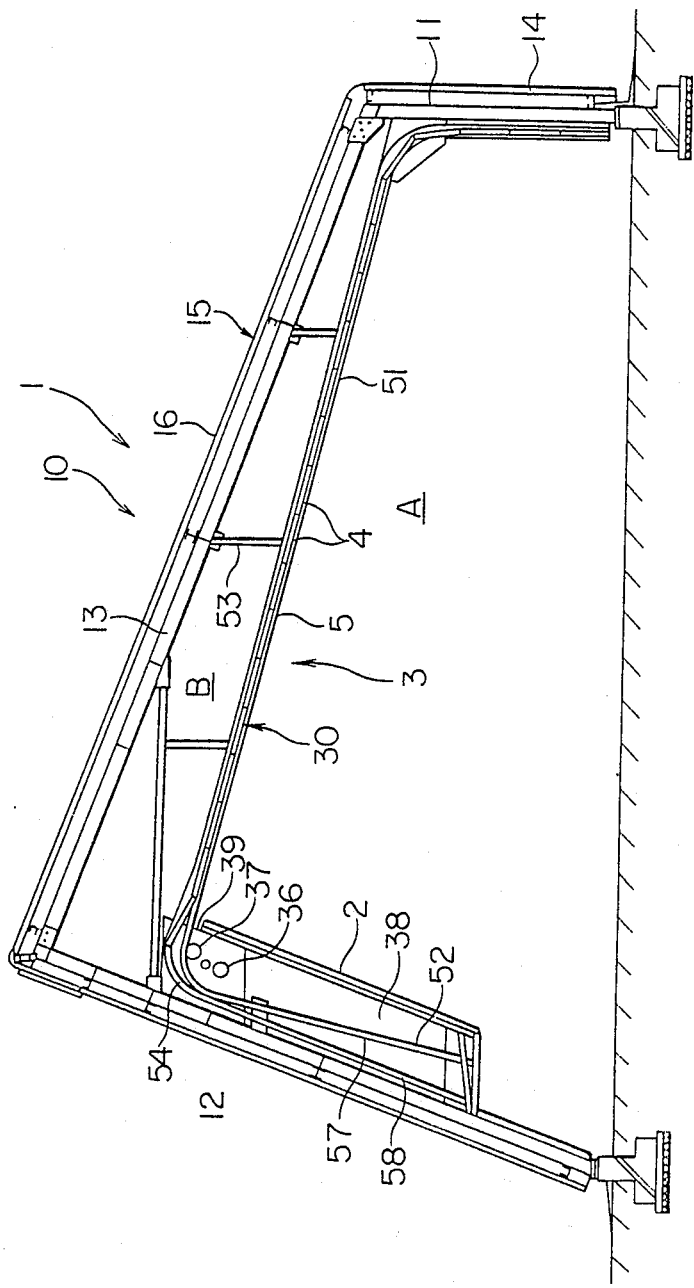
FIG. 6 is a cross-sectional view similar to FIG. 5, except that the shutter is completely closed.

A hothouse for cultivation 1 according to the present invention comprises a shutter 3 in the hothouse 10, as shown in FIGS. 5 and 6. The shutter 3 is composed of a guide rail assembly 5 and a shutter curtain 30 which is fabricated by connecting successively a number of slats 4. The shutter 3, different from ordinary way of setting up at an opening, is set between the entirely opened position as shown in FIG. 5 and the completely closed position as shown in FIG. 6 so that the shutter can be opened and closed freely between the two positions. In this case, the shutter curtain 30, with the vertical portion along the post on the southern side 11 and the ceiling portion supported by the wall 14 whose angle of inclination is smaller than the angle of inclination $\alpha$ of the roof 15, divides the inside space of the hothouse 10 into two spaces which are the inside space A and the roof side space B. Accordingly, the roof side space B constitutes a heat insulation air space between the shutter curtain 30 and the roof 15 when the former is completely closed.

Figure 7:
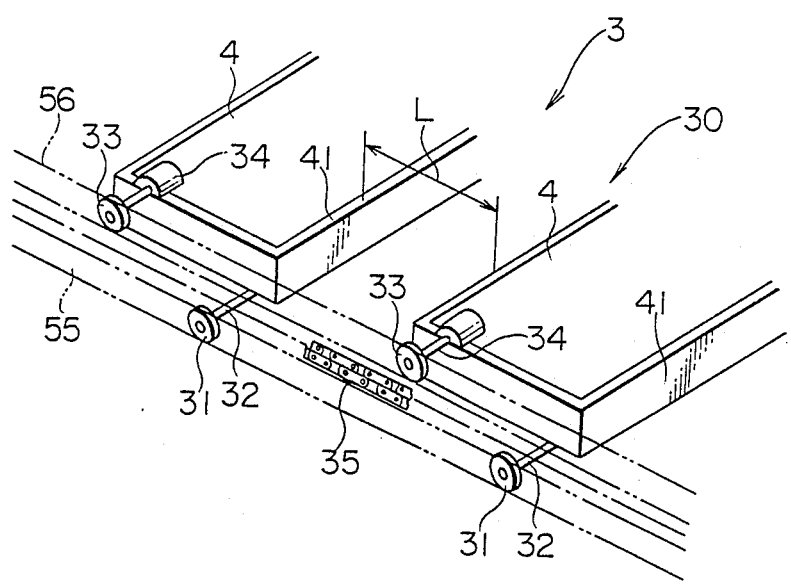
FIG. 7 shows the major part of the shutter.

Details of each portion of the shutter 3 is now explained referring to FIG. 7. The slat 4 is shaped into a panel in a metallic mold 41 from a plate which is fabricated from heat insulators, for example, expandable rigid polyurethane foam with appropriate means such as an injection method or a laminate method. The slat 4 has a roller 31 which projects outwardly from the end on the lower surface and another roller 33 which projects outwardly from the end on the upper surface. The roller 31 is supported by a roller shaft 32, while the roller 33 is supported by a roller shaft 34. Each slat 4 is connected to each other through a driving chain 35 at its roller shaft 32 to form the shutter curtain 30. The driving chain 35 connects each pair of slats 4 with a distance L between them. Reference number 36 is an operator for opening and closing the shutter curtain 30, 37 is a driving sprocket for driving the driving chain 35 in both directions in order to open and close the shutter curtain 30, and 38 is a room for receiving the shutter curtain 30, the room 38 being supported in parallel with the post on the northern side 12. If the reflexion plate 2 is attached to the side wall of the room 38 on the surface facing to the inside of the hothouse 10 to form the reflectors 21, the first basic hothouse and this second hothouse can be integrated. Reference number 39 is a sealing sheet attached to the uppermost slat 4 for assuring the airtightness of the inside space by sealing the opening between the shutter curtain 30 and the top of the room 38 when the former is completely closed.

On the other hand, the guide rail assembly 5 is composed of guide rails 51 and reception rails 52. The guide rail assembly 5 is set between the posts of the hothouse 10 with the vertical portion of the guide rails 51 supported by the post 11 and the ceiling portion suspended by a suspender 53 extending from the beam 14. The guide rail assembly 5 is bended downward at the bending portion 54 near the top and extending toward the reception rails 52. Each guide rail 51 has an E-shaped vertical cross-section, and is composed of two parts: an inside guide rail 55 and an outside guide rail 56. The rollers 31 and 33 are respectively fitted into the inside guide rail 55 and the outside guide rail 56, and are guided by rotation. At the ceiling portion, each slat 4 of the shutter 3, guided by the rollers 31, 33, is aligned along the guide rail 51 to form the shutter curtain 30. On the other hand, in the room 38, when the shutter 3 is entirely opened, each slat 4 is accumulated horizontally with its rollers 31, 33 contacted with those of the adjacent slat because the reception rail 52 is branched into two rails 57 and 58 at the bending portion 54. The function of the shutter 3 is the same as a shutter which is set at an opening of a usual construction.

Figure 8:
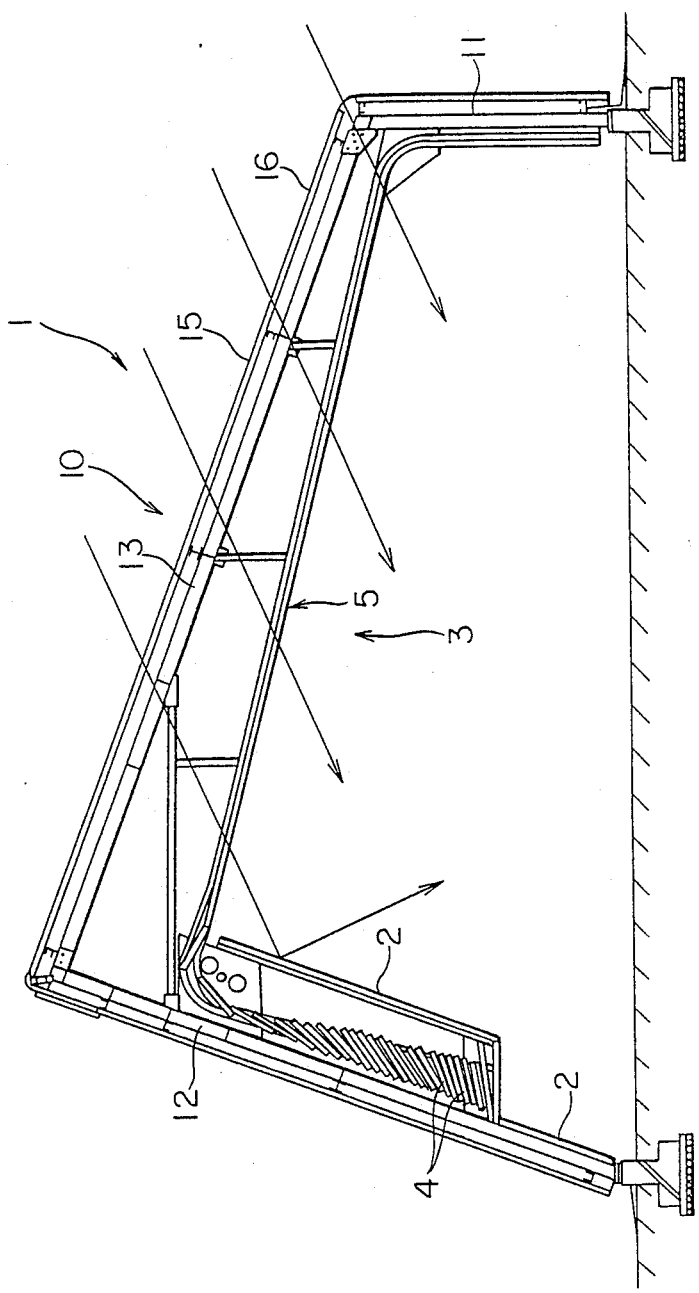
FIG. 8 is a cross-sectional view of a hothouse for cultivation showing the trajectory of transmission light when the shutter is entirely opened.
Figure 9:
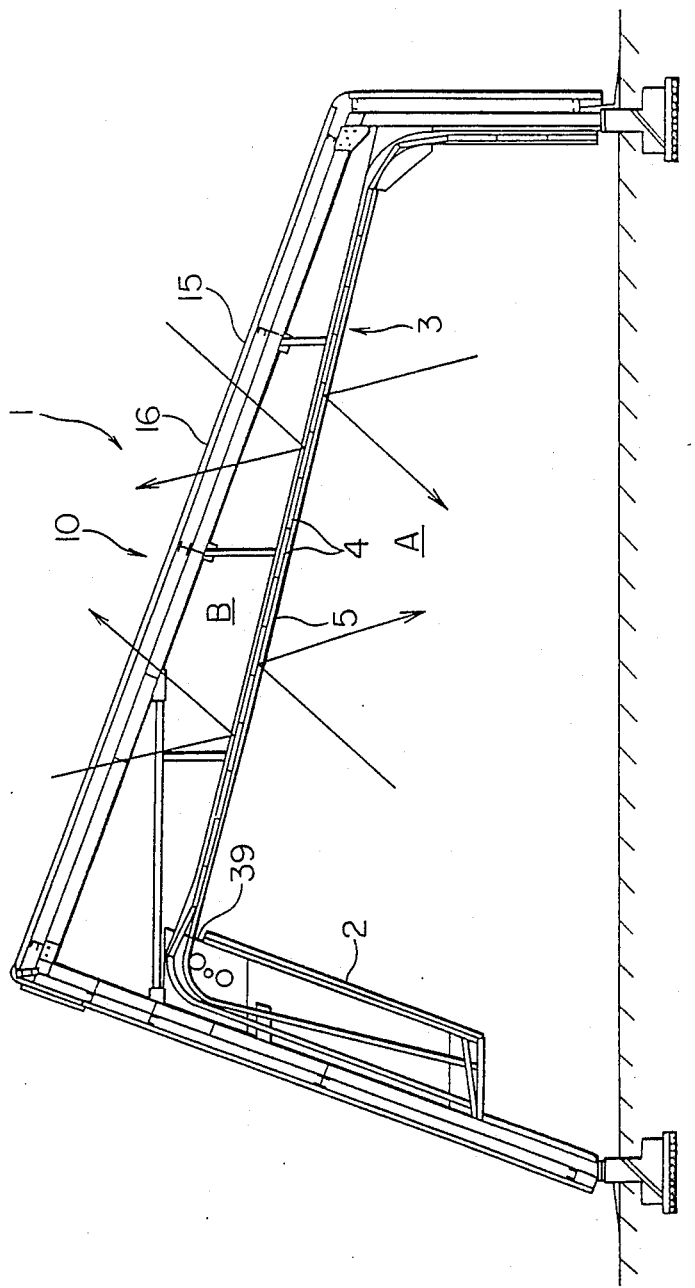
FIG. 9 is a cross-sectional view of a hothouse for cultivation showing the trajectory of reflected light when the shutter is completely closed.

With the structure mentioned above, the shutter 3 constitutes a heat insulation air space B when it is completely closed. If the reflectors 21 are attached to the surface of each slat 4, the effectiveness of the temperature control of the hothouse 10 can be improved. Now, we refer to FIGS. 8 and 9. When the shutter 3 in FIG. 8 is entirely opened, the sunlight penetrates into the hothouse 10 just as shown in FIG. 1. However, when the shutter 3 is completely closed, heat radiation from the inside of the hothouse 10 is reflected at the reflectors 21 which are attached to the inside surface of the slats 4, and therefore is reflected at the inside surface of the shutter curtain 30. Accordingly, the heat radiation does not dissipate outwardly toward the upward direction and the effect of the heat insulation space B is remarkably improved. When the reflectors 21 are applied to each slat 4, it is therefore necessary to apply them at least to the inside surface of each slat 4. The reflectors 21 which are attached to the outside surface is considered to reinforce the function of the shutter curtain as a sunshade sheet when the sunshine is too strong in a hot season.

Figure 10:
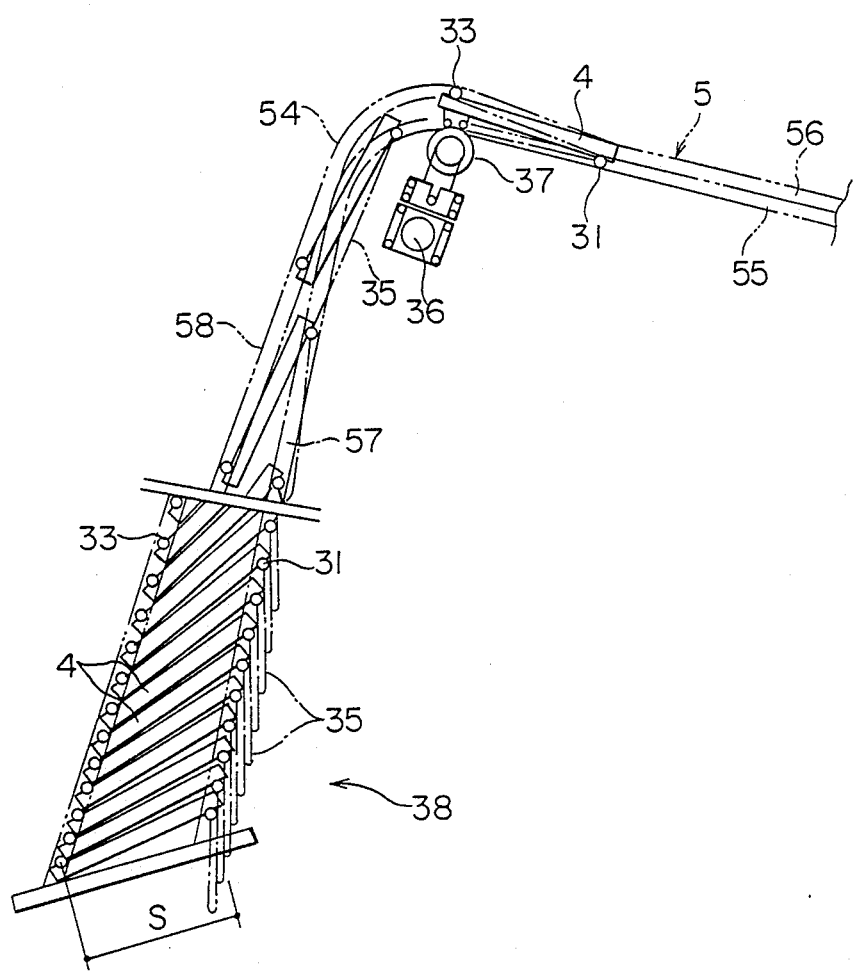
FIG. 10 is a side view of an embodiment of reception rails.
Figure 11:
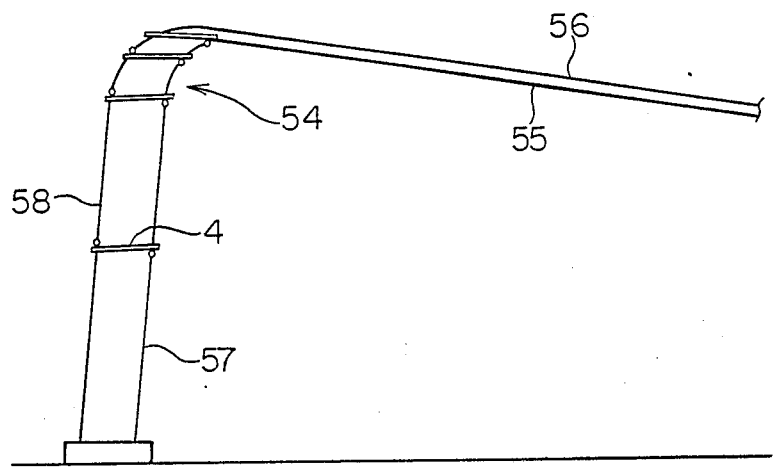
FIG. 11 and FIG. 12 are explicative drawings of conventional reception rails.
Figure 12:
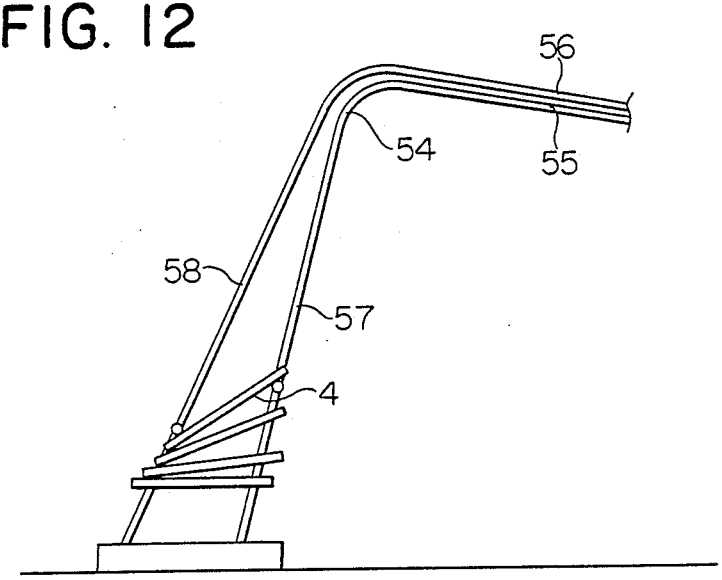
Figure 13:
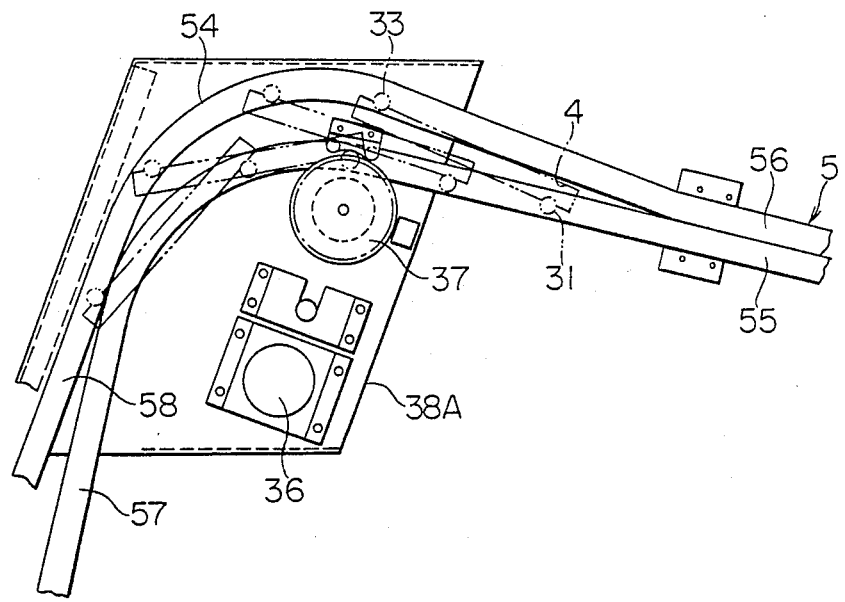
FIG. 13 is a detailed view of the bending portion of the guide rails.

Next, another embodiment of the shutter 3 is explained referring to FIG. 10. In this embodiment, the angle of inclination of the inside rail 55 and that of the outside rail 56 is different at the bending portion 54 where the guide rails 51 are bending downward. The angle of inclination of the inside rail 55 is closer to the vertiacal. In other words, the angle of inclination of the reception rail 58 of the rail 56 is β which is already given, while the angle of inclination of the reception rail 57 is larger than β. Therefore, the distance between the reception rail 57 and the reception rail 58 becomes gradually larger to reach at the bottom of the room 38 the value S which corresponds to the distance between the rollers 31 and 33 determined by the width of the slat 4. With this structure, when the top portion of each slat 4 passes through the bending portion 54 and takes downward position, the following bottom portion of each slat 4 goes down successively along the opening angle between the reception rails and the slats 4 are accumulated smoothly with the lower slat nearer to horizontal angle. In addition, in this embodiment, the outside guide rail 56 makes a detour outwardly at the bending portion 54 and the inside guide rail 55 enters the detoured space. This structure is advantageous compared with those shown in FIGS. 11 and 12 in which the prior art is utilized as it is. Therefore, as shown in FIG. 13, a reception case 38A can be set with more tolerance with respect to the driving apparatus such as the operator 36 and the sprocket 37 which are mounted inside the bending portion 54 above the room 38. In addition, the driving chain 35 gets out more difficultly from the sprocket 37. Furthermore, the inside reception rail 57 can be easily inclined.

Figure 14:
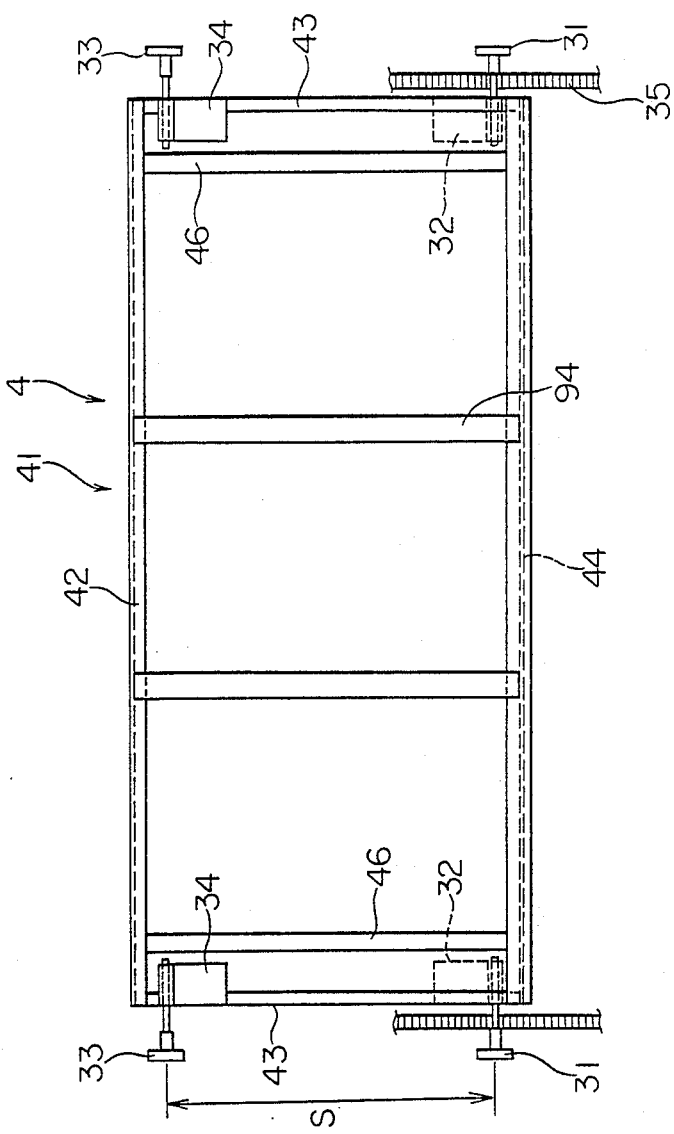
FIG. 14 is a plan of a slat.
Figure 15:
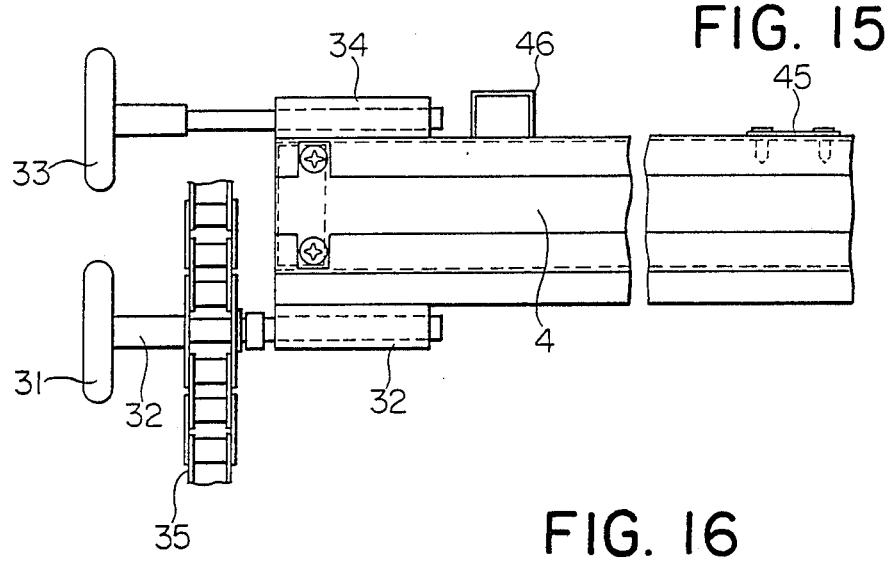
FIG. 15 is a side view of the end of the slat.
Figure 16:
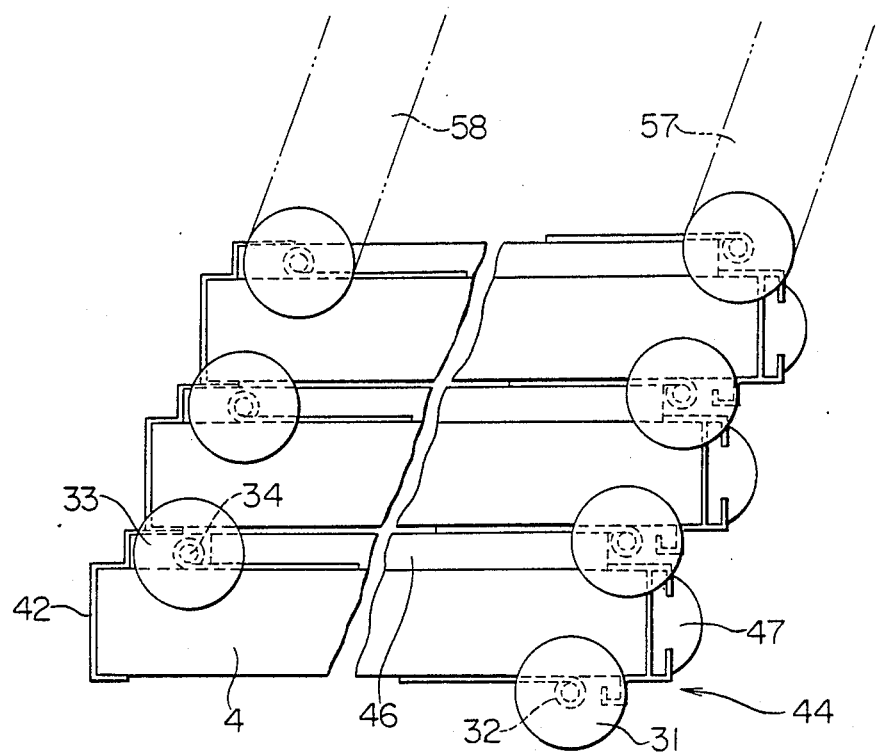
FIG. 16 is a drawing for explaining the accumulated statre of the slats.

In FIG. 14 to FIG. 16, accumulated state of the slats 4 is shown in more detail. FIG. 14 is a plan, FIG. 15 is a side view of the end of the slat, and FIG. 16 is a side view showing the accumulated state of the slats. The slats 4 is shaped into a panel using a mold 41. Reference number 42 is an upper framework, 43 is a lateral framework, 44 is a lower framework and 45 is a reinforcement frame. At the side of the lateral frameworks 43 and at both ends of the slats 4, the projecting rollers 31 are supported by the roller shaft supporters 32 near the lower framework 44 on the lower surface of the slat and the projecting rollers 32 which preceed the rollers 31 are supported by the roller shaft supporters 34 near the upper framework 42 on the upper surface of the slat. The distance between the rollers 31 and 33 are given as S. Each roller shaft supporter 32, 34 is projecting from the surface of the slat 4. A protection frame 46 which is a little higher than the roller shaft supporters is attached to the slat 4 at a different place from the roller shaft supporters, thereby the surface of the adjacent slats in an accumulated state does not contact to each other. As the reception rails 57, 58 are inclined and each slat 4 is accumulated to form steps, the driving chain 35 which connects the rollers 31 is folded in a freely suspended state as shown in in FIG. 10. Accordingly, there is no risk that the driving chain 35 twines around the roller shaft 32. From FIG. 16 which shows a detailed cross-sectional view of the lower tramework 44, one can see that a molded member is used as the lower framework in order to fix to it a damper 47 for reducing the impact of contact between the adjacent slats.

Figure 17:
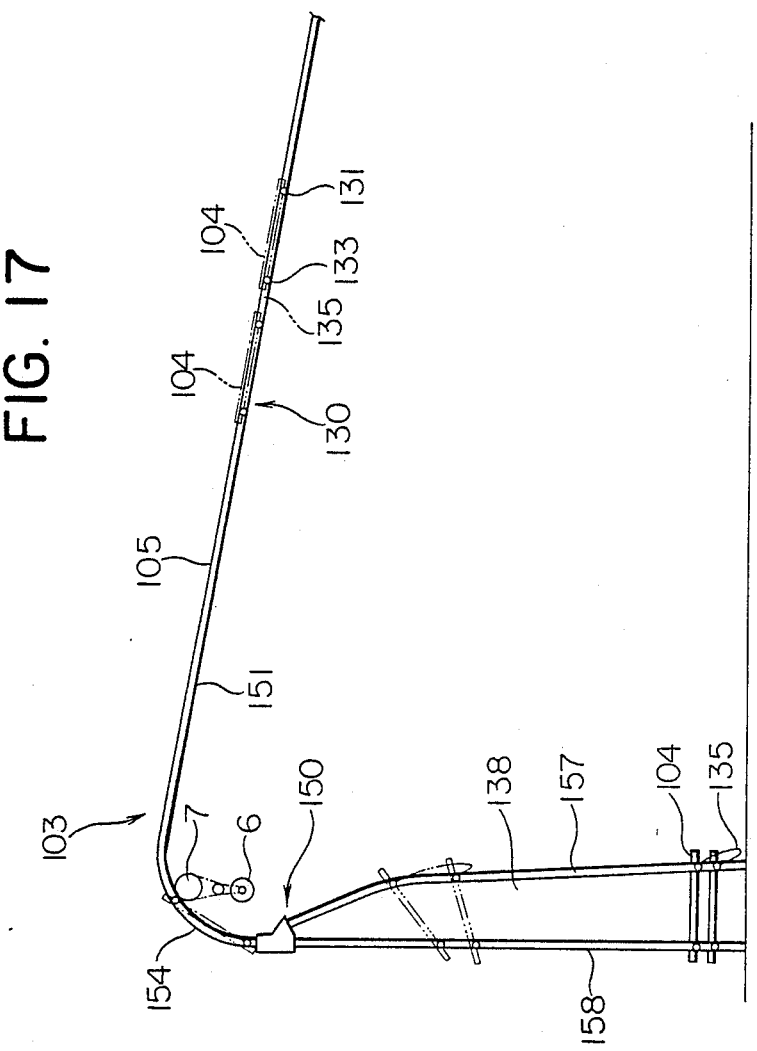
FIG. 17 is a side view of an embodiment of a single guide rail.
Figure 18:
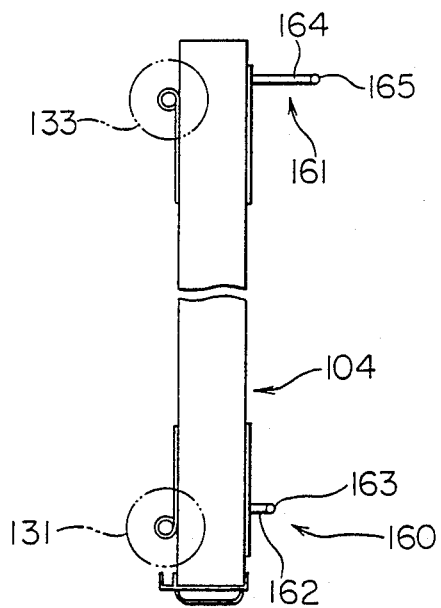
FIG. 18 is a cross-sectional view of another slat.
Figure 19:
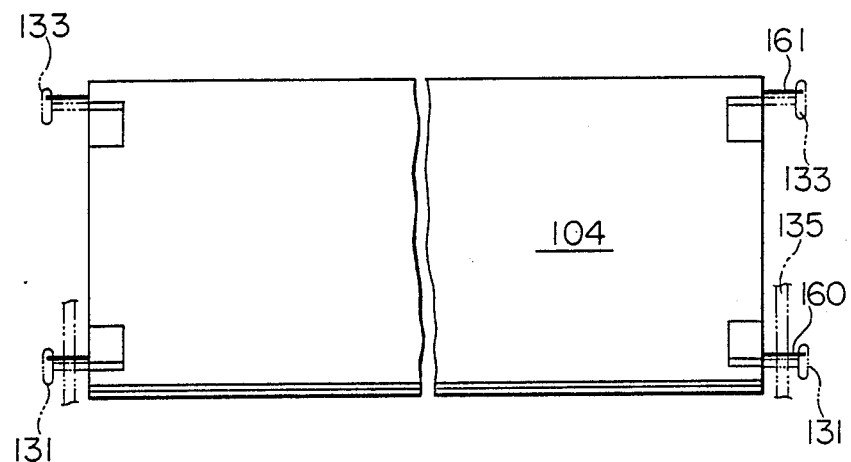
FIG. 19 is a view from the bottom of the slat in FIG. 18.

FIG. 17 to FIG. 25 shows another embodiment of the shutter 3. In FIG. 17, each reference number is increased by 100 for corresponding elements to those shown in the preceeding drawings. The shutter 103 of this embodiment comprises, just as a shutter which is set at an opening of a usual construction, a single type guide rail 151 as an element for constituting the guide rail assembly 105. The shutter curtain 130 opens and closes along the ceiling portion of the guide rail 151 by the driving force of the driving chain 135. When the slats 104 are received in the room 138 one by one from the uppermost one, the rollers 133 and 131 proceed toward the reception rails 158, 157 after passing through the bending portion 154. As shown in FIGS. 18 and 19, guiding bars 160 and 161, which cooperate with a branched guide member 150 by contact, are mounted on the external surface of the slat 104 through auxiliary members FIG. 18 is a cross-sectional view of the slat 104; FIG. 19 is a plan of its inside. First of all, the slat 104 is explained. The guide bars 160, 161 are projecting at the corresponding place from the opposite surface of the slat 104 to the surface on which the rollers 131, 133 are mounted. The guide bar 160 is composed of a supporting bar 162 which raises up perpendicularly from the surface of the slat 104 and a hook 163 which is folded so as to be parallel with the surface the slat 104. The guide bar 161 is, just as the guide bar 160, composed of a supporting bar 164 and a hook 165. The two guide bars are different only in the height of the supporting bar, the supporting bar 162 being smaller than the supporting bar 164.

Figure 20:
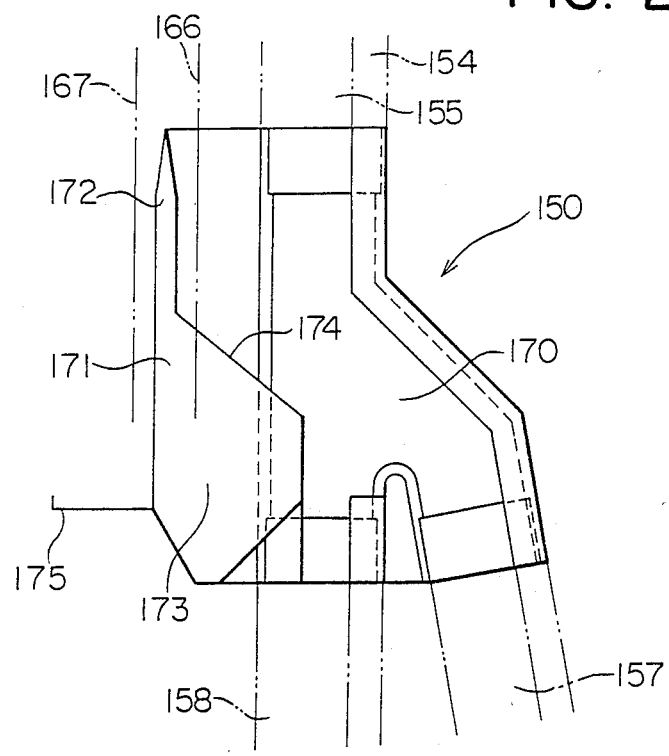
FIG. 20 is a vertical cross-sectional view of a branched guiding members.
Figure 21:
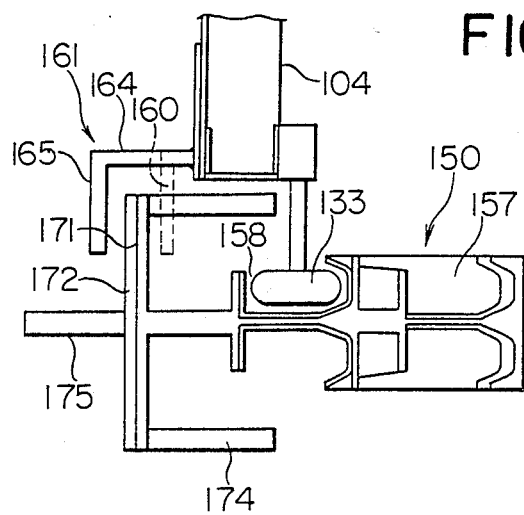
FIG. 21 is a horizontal cross-sectional view of the branched guiding members in FIG. 20.

The branched guide member 150 is shown in FIG. 20 which is a side view and in FIG. 21 which is a plan. The slats 104 are supported on both lateral sides by the branched guide member 150 in this example. A branching portion 170 of the guide rail 155 for letting the rollers 131, 133 pass is formed between the upper portion which is connected to the bending portion 154 of the guide rail 151 and the lower portion which is connected to the reception rails 157, 158. A limiting member 171 which has a special configuration is extending outwardly from the external surface 156 of the guide rail 151. This limiting member 171 is a bracket-like U-shaped member which is fixed to the external surface of the guide rail 151. On the external surface of the limiting member 171, a branching edge 172 is mounted vertically with its top positioned between the trajectories 166, 167 of the hook defined by the height of the guide bars 160, 161. The upper surface of one of the flanges 173 of the U-shaped member constitutes a guide surface 174 for the guide bar 160. Reference number 175 is a framework and has no relation to the function explained just above.

Figure 22:
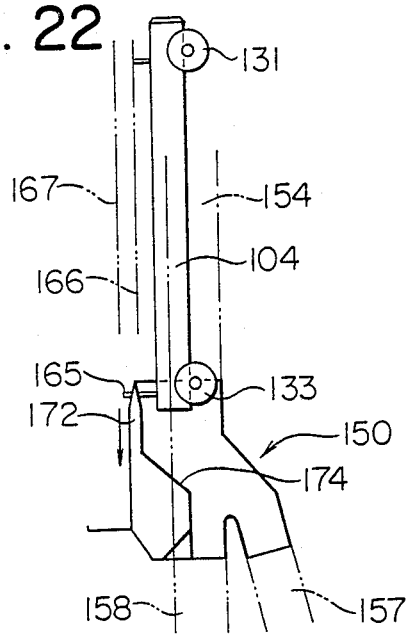
FIG. 22 to FIG. 25 are explicative drawings of the function of the branched guiding members.
Figure 23:
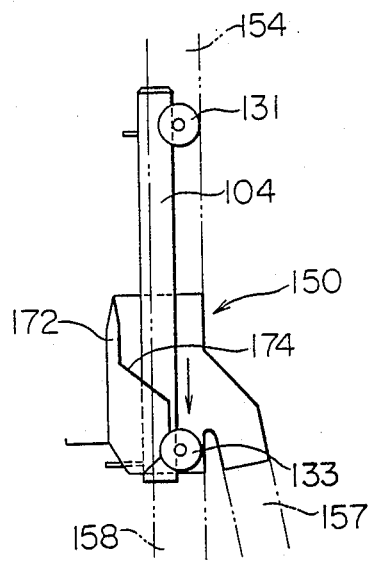
Figure 24:
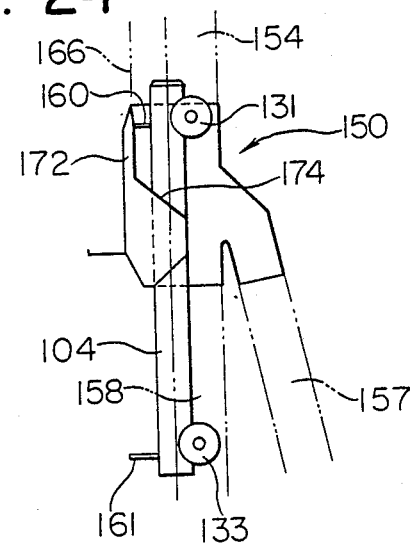
Figure 25:
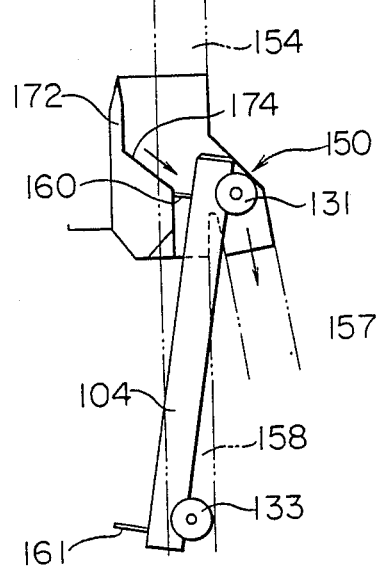

With this structure, as shown in FIG. 22, when the front roller 133 of each slat 104 reaches the top of the branched guide member 150, the hook 165 of corresponding guide bar 161 passes outside of the branching edge 172 and guides the slat 104 while by maintaining its vertical state along the external surface of the limiting member downwardly as shown by the arrow (FIG. 23). Next, as shown in FIG. 24, when the rear roller 131 of each slat 104 reaches the branching point, the lower hook 163 faces to the inside surface of the branching edge 172 and is guided along the inclined guide surface 174. Then the slat 104 comes to the state as shown in FIG. 25 and moves toward the arrow. The rear portion of the slat 104 is inclined toward the branched portion and the roller 131 moves toward the reception guide rail 157 at the branching portion 170. Then, the movement of the shutter curtain 130 along the single guide rail 151 is transformed into that for accumulating the slats horizontally. When the shutter 103 is closed, the branching portion 170 serves as the joining portion and therefore causes no problem to the translation of the slats.

Next, ventilation equipment 6 which is applied to the hothouse for cultivation 1 is explained. As shown in FIG. 26 to FIG. 29, when the shutter curtain 30 is opened in the morning from the completely closed position for the night, the driving force of the sprocket 37 is transmitted to the driving chain 35 and the slats 4 are wound up one by one from the uppermost one. Accordingly, the effect of the heat insulation air space B which is formed by closing completely the shutter 3 is lost suddenly to lower the temperature of the inside space A, which gives bad influences on the plants. According to an embodiment of the present invention, when the slat is going up along the whole length of the ceiling portion of the guide rail 51, there are formed openings for ventilation, as shown by the arrows, with a width L between the adjacent slats, the width being defined by the length of the driving chain 35.

This state is maintained until just after the shutter curtain is opened. Accordingly, the heat contained in the inside space A is transmitted gradually toward the roof side space B while the above-mentioned state is maintained. One can wait for the sun to rise high in the sky in order to receive sufficient sunlight before the shutter curtain 30 is entirely opened.

Figure 27:
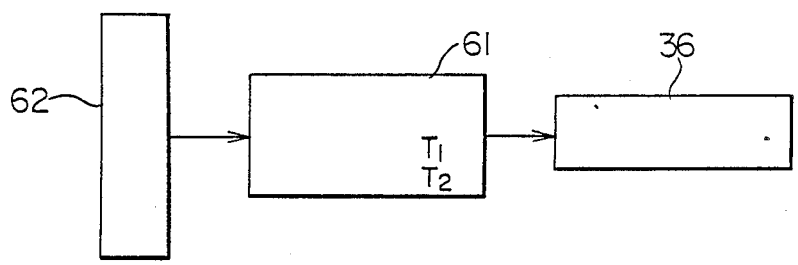
FIG. 27 is a blockdiagram of the control system.
Figure 28:
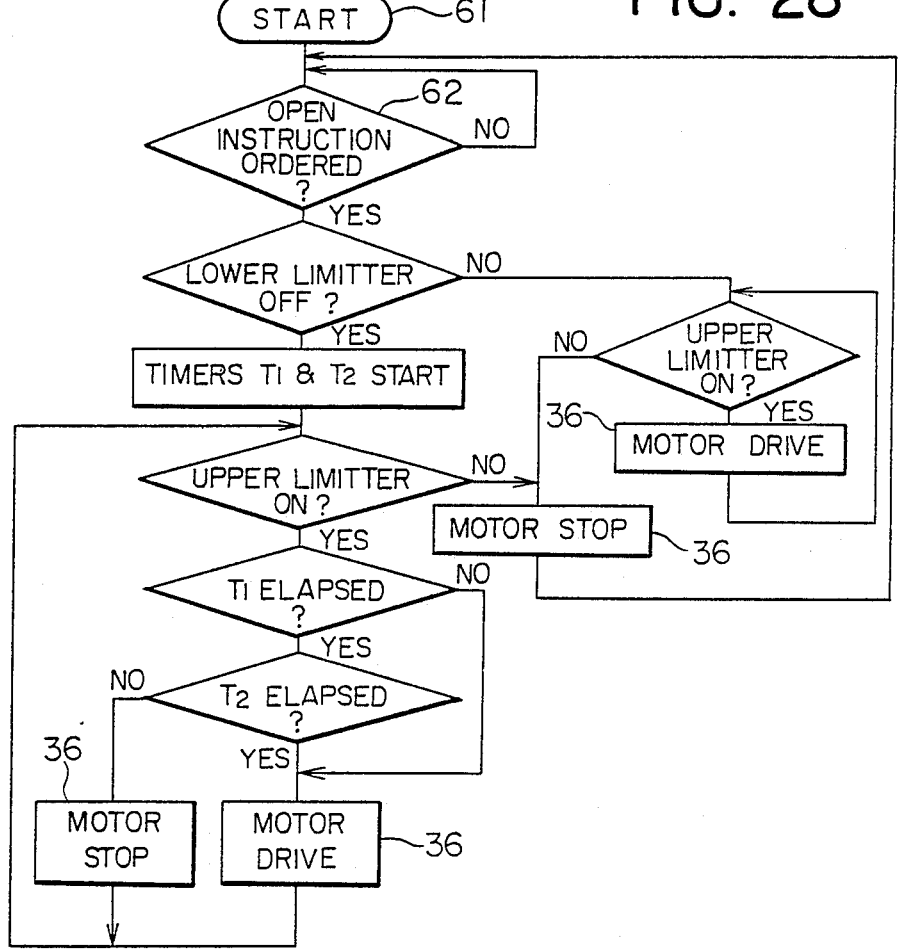
FIG. 28 is a flowchart of the control system.
Figure 29:
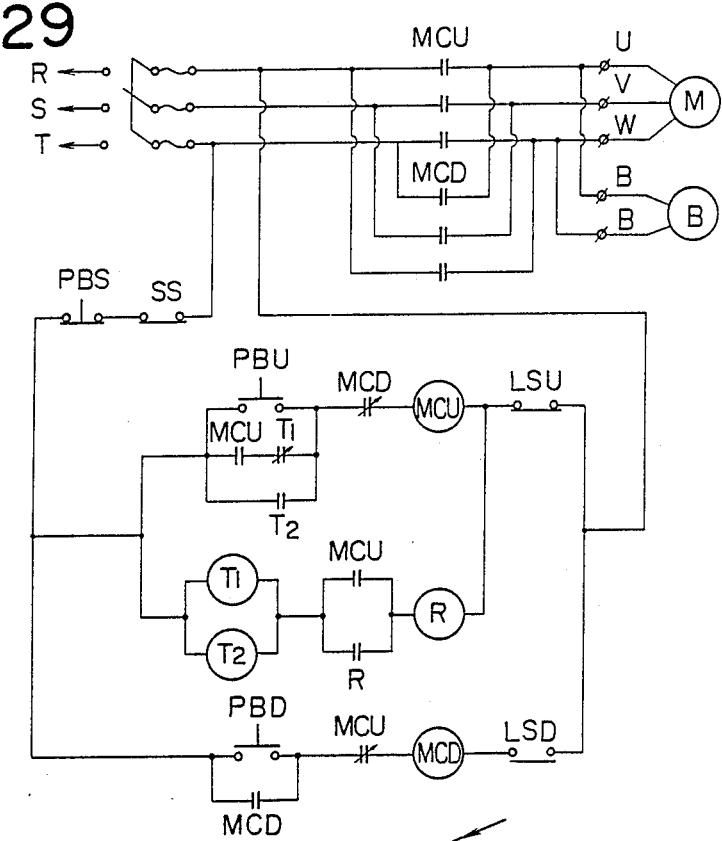
FIG. 29 shows another control circuit.

FIG. 27 to FIG. 29 show a control device 60 of the shutter curtain 30 which is equipped with the ventilation equipment 6. FIG. 27 is a block diagram of the control system. Reference number 61 is a controller composed of a microprocessor which comprises two timers $T_1$ and $T_2$. 62 is an open-close instruction output unit for controlling the opening and closing of the shutter curtain through the operator 36. FIG. 28 is a flow-chart for such control. FIG. 29 is an electrical circuit comprising relays for controlling the opening and closing of the shutter curtain 30 instead of using a microprocessor.

Figure 26:
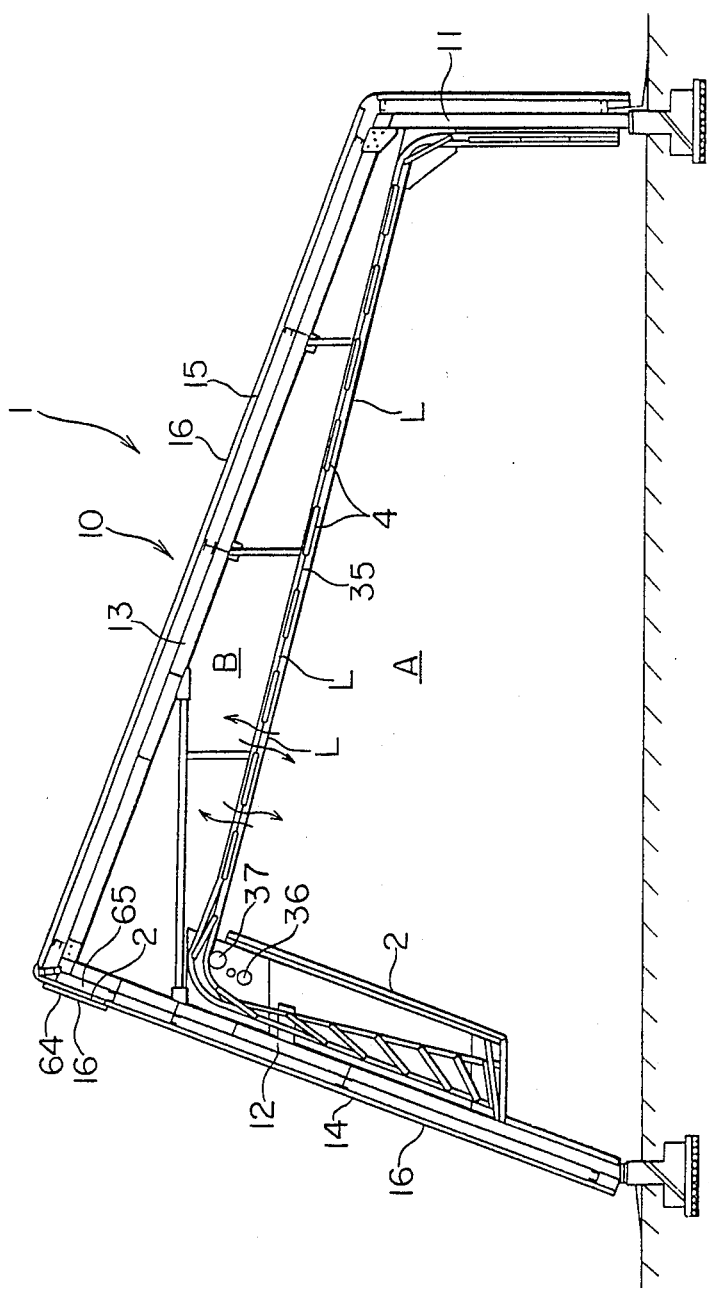
FIG. 26 is a cross-sectional view of a hothouse for cultivcation comprising installations for ventilation.

In addition, according to the present invention, window means for ventilation are provided at the ridge portion where high temperature air tends to gather. In FIG. 26, on the upper portion of the external wall on the northern side 14 near the ridge, a skylight 64 is provided. The skylight 64 is covered with the same sheet 16 as the external wall 14 on the northern side and serves as an opening for ventilation by opening and closing it. Any structure can be employed for the skylight 64, but it is easy to use a conventional suspension method from upward with a supporting shaft. With this method, the open-close operation of the skylight can be remote-controlled. If the reflexion plate 2 is attached also to the inside surface of the skylight 64, even the incidence sunlight to the uppermost portion of the hothouse 10 contributes to the effect of the separate type reflexion plate shown in FIG. 3, and the effect of the hothouse 10 is further improved.

Figure 30:
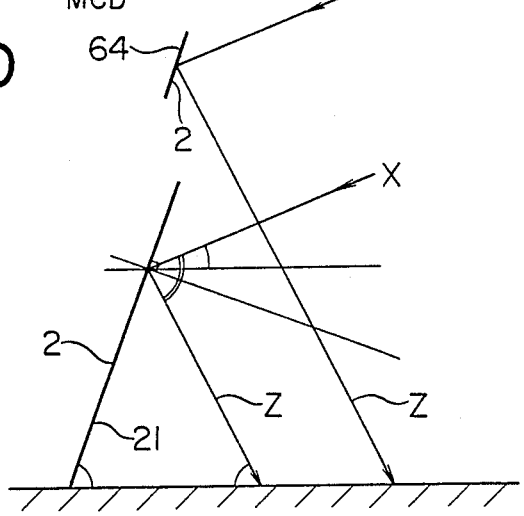
FIG. 30 is an explicative drawing for explaining the reflexion of the light at a skylight.
Figure 31:
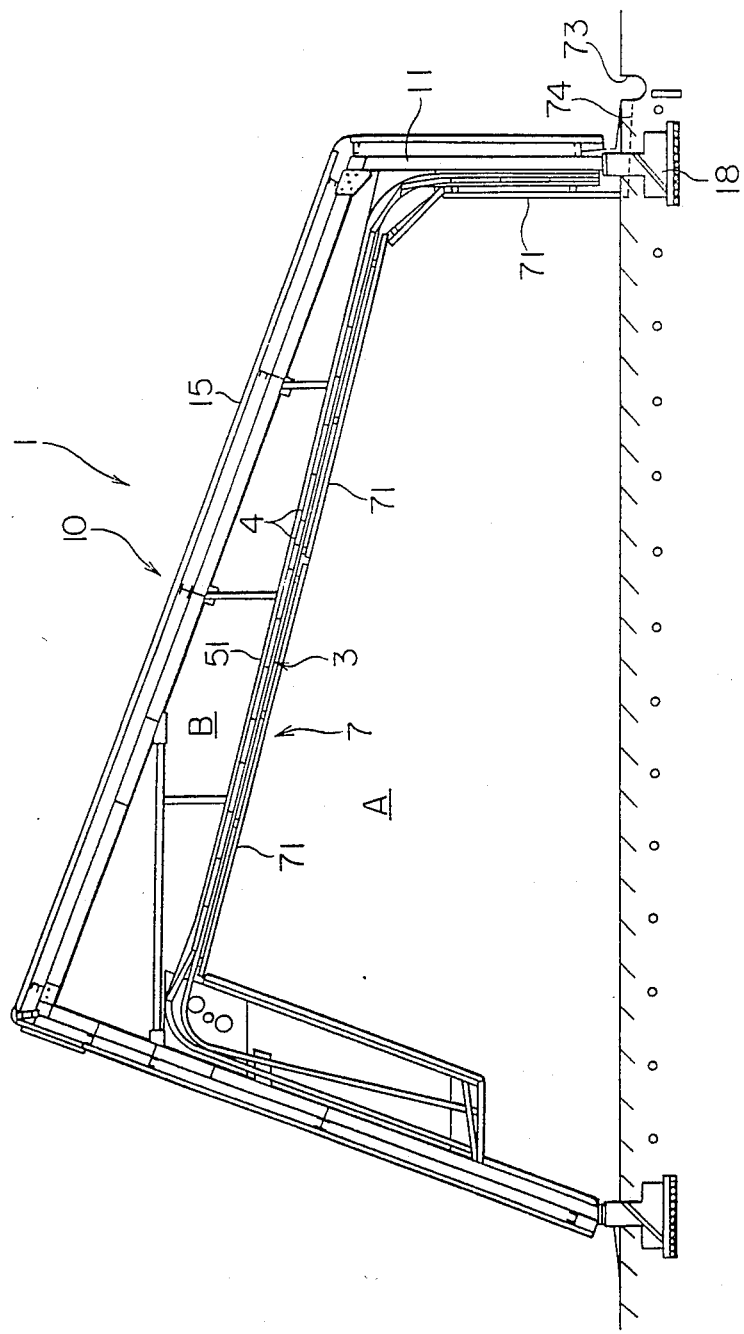
FIG. 31 is a cross-sectional of a hothouse for cultivation comprising drainage.
Figure 32:
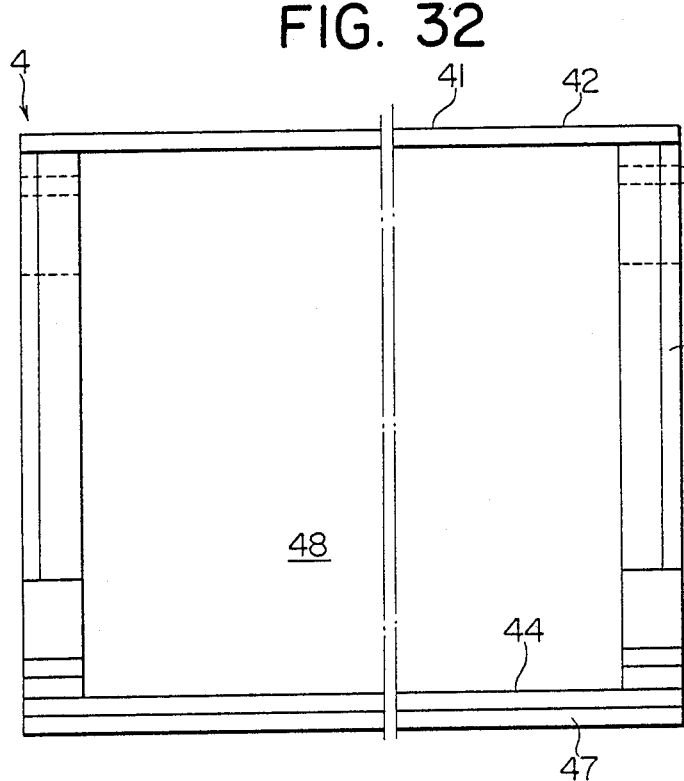
FIG. 32 is a view from the bottom of a slat of a shutter.
Figure 33:
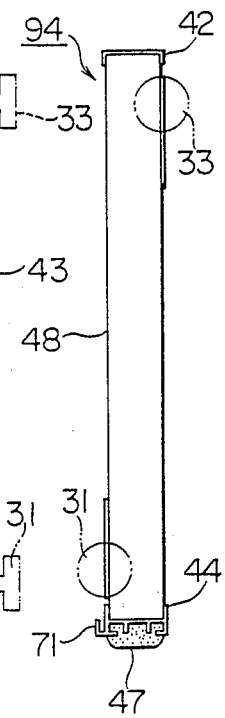
FIG. 33 is a cross-sectional view of the slat in FIG. 32.
Figure 34:
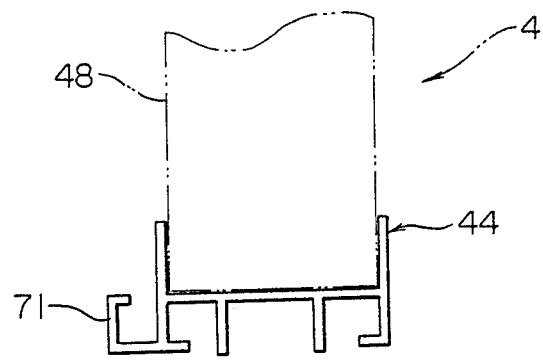
FIG. 34 a detailed cross-sectional view of the bottom of the slat.

The third invention relates to a hothouse for cultivation 1 which comprises drainage for collecting condensed water drops which are created inside the hothouse 10. When the hothouse is switchable by the shutter 3 in the hothouse 10 between two types of hothouses which are a hothouse composed only of the transparent members and a double hothouse comprising a heat insulation space between the shutter completely closed and the transparent members, the hothouse for cultivation is characterized in that the drainage is realized by spreading the shutter 3 with its ceiling portion slightly inclined from the higher northern side to the lower southern side, by providing each slat 4 which constitutes the shutter curtain 30 with a water receiving drain at the lateral side on the surface facing to the inside of the hothouse, and by guiding the condensed water on the lower surface of the slat 4 toward a conduit which is provided along the guide rail assembly 5. This drainage is explained referring to FIG. 31 to FIG. 30. FIG. 31 is a cross-sectional view of the whole hothouse for cultivation 1 which comprises the shutter 3 and is equipped with the drainage 7. FIG. 31 to FIG. 34 are explicative drawings of a water receiving drain 71. FIG. 35 to FIG. 39 are explivative drawings of a conduit 72. FIG. 32 is a view from the bottom of the slat 4 facing toward the inside of the hothouse; FIG. 33 is its longitudinal cross-sectional view; and FIG. 34 is a detailed cross-sectional view of the bottom portion of the slat 4. Reference numbers are common to those in FIGS. 14 and 15 for the corresponding elements. The slat 4 is shaped into a panel using a mold 41 which is constituted by the combination of the upper framework 42, the lateral frameworks 43 and the lower framework 44. The reference number 48 represents the lower surface of the slat 4 facing to the inside of the hothouse. 47 is a damper for keeping the airtightness and for reducing the impact between the slats 4. The damper is made of an elastic rubber and its cross-section is a semicircle. A molded member with a special cross-section is especially used for the lower framework 44 in order to fix to it the damper 47. From the surface facing to the inside of the hothouse, a part of flange is projecting to form the water receiving drain 71 which is integrated to the lower framework 44.

Figure 35:
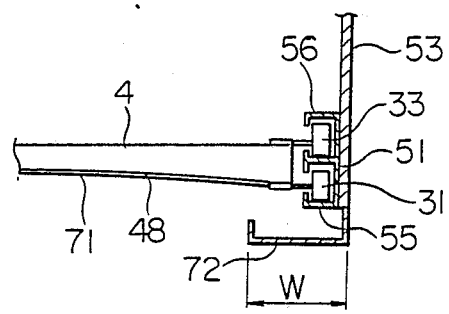
FIG. 35 is a cross-sectional view of drainage of condensed water at the gable of the external wall.
Figure 36:
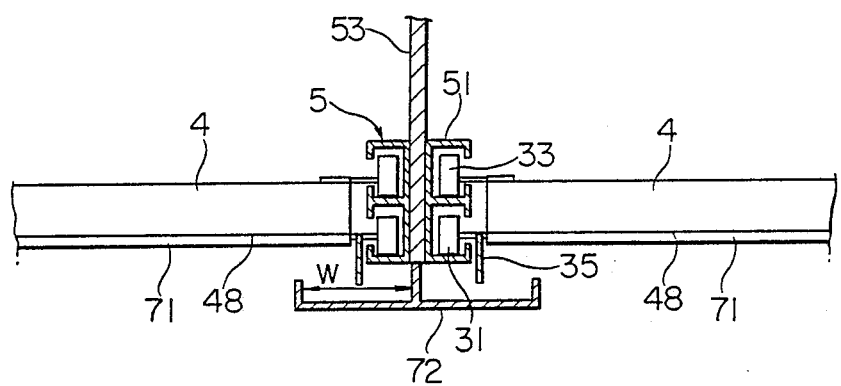
FIG. 36 is a similar cross-sectional view at the central beam.
Figure 37:
FIG. 37 to FIG. 39 are front views of other slats.
Figure 38:
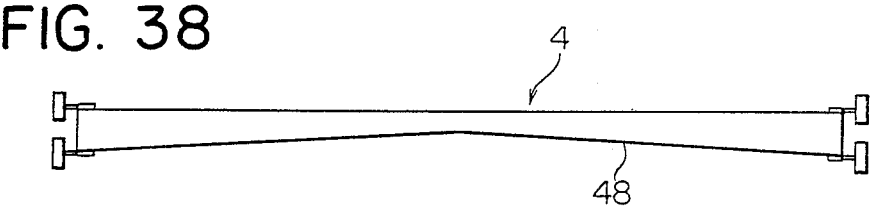
Figure 39:
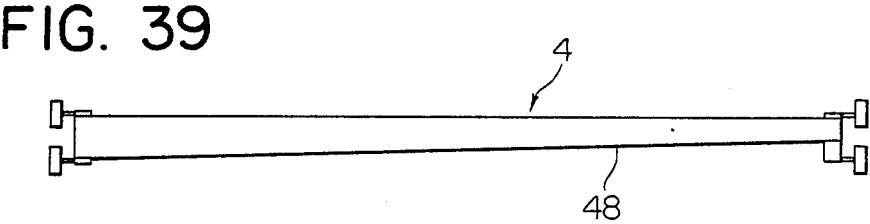

FIG. 35 is a cross-sectional view of the end of the slat 4. The rollers 31 and 33 are supported through the shafts by the lateral framework 43 at the end of the slat 4. Each roller 31, 33 is respectively fitted into the inside guide rail 55 and the outside guide rail 56. 53 is, as mentioned above, an auxiliary member extending from the beam 13. The conduit 72 is mounted along the guide rail 51 at the lower end of the auxiliary member so that the condensed water on the lower surface 48 of the slat 4, which is first received in the water receiving drain 71, is guided to the conduit 72 and drained along the guide rail 51. Therefore, the lower surface 48 is an inclined surface with its central portion high and with its end portion low. FIG. 36 is a cross-sectional view of the conduit 72 which is mounted on both sides of the central beam 13 of the hothouse 10. The width W of each conduit 72 is chosen so that the conduit and the end portion of the slat 4 overlap sufficiently. Other examples of inclination of the lower surface 48 are given in FIG. 37 to FIG. 39. The profile of the lower surface 48 is an arc with a large diameter in FIG. 37, a triangle with a large top angle in FIG. 38 and an inclined flat surface in FIG. 39. The inclined flat surface is especially suitable for the example shown in FIG. 36.

Figure 40:
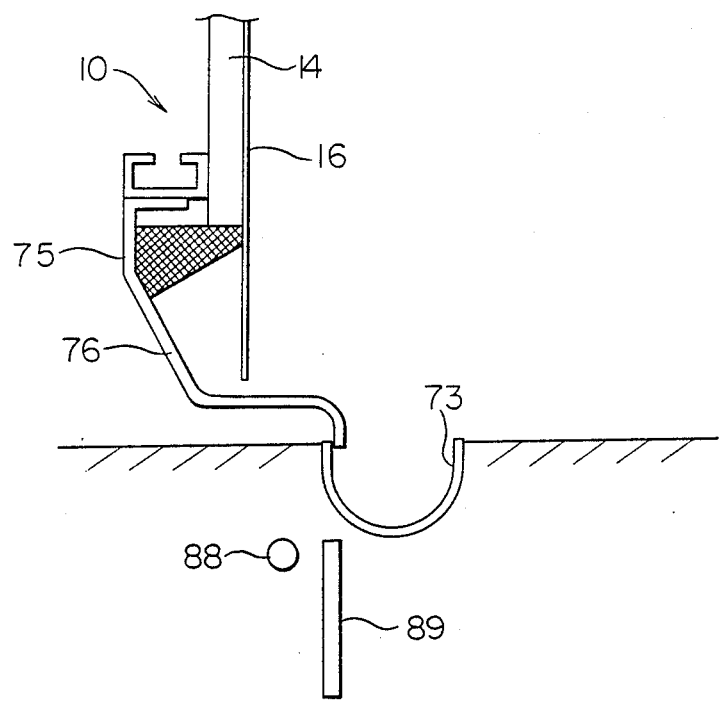
FIG. 40 is a detailed cross-sectional view at the bottom of the external wall on the southern side of a hothouse for cultivation.

On the other hand, the conduit 72 is inclined on the southern side along the guide rail 51, as shown in FIG. 31. The conduit 72 is guided downward along the post 11 to lead to an outdoor drain 73 through a pipe 74 below the ground surface. FIG. 40 is a detailed drawing of the outdoor drain 73. The drawing shows the treatment of the condensed water which is created on the inside surface of the external wall 14 is shown. Because of the difference of temperature between the inside of the hothouse 10 and the outside, vapor condenses on the inside surface of the sheet 16. The water created in this way flows downward and is guided through a filler 75 toward the outdoor drain 73 from the upper surface of a cutwater 76. The filler 75 is made of, for example, flexible polyethylene foam. The filler is permeable, but, in a wet state, its small holes are filled to maintain the airtightness of the inside of the hothouse.

Figure 41:
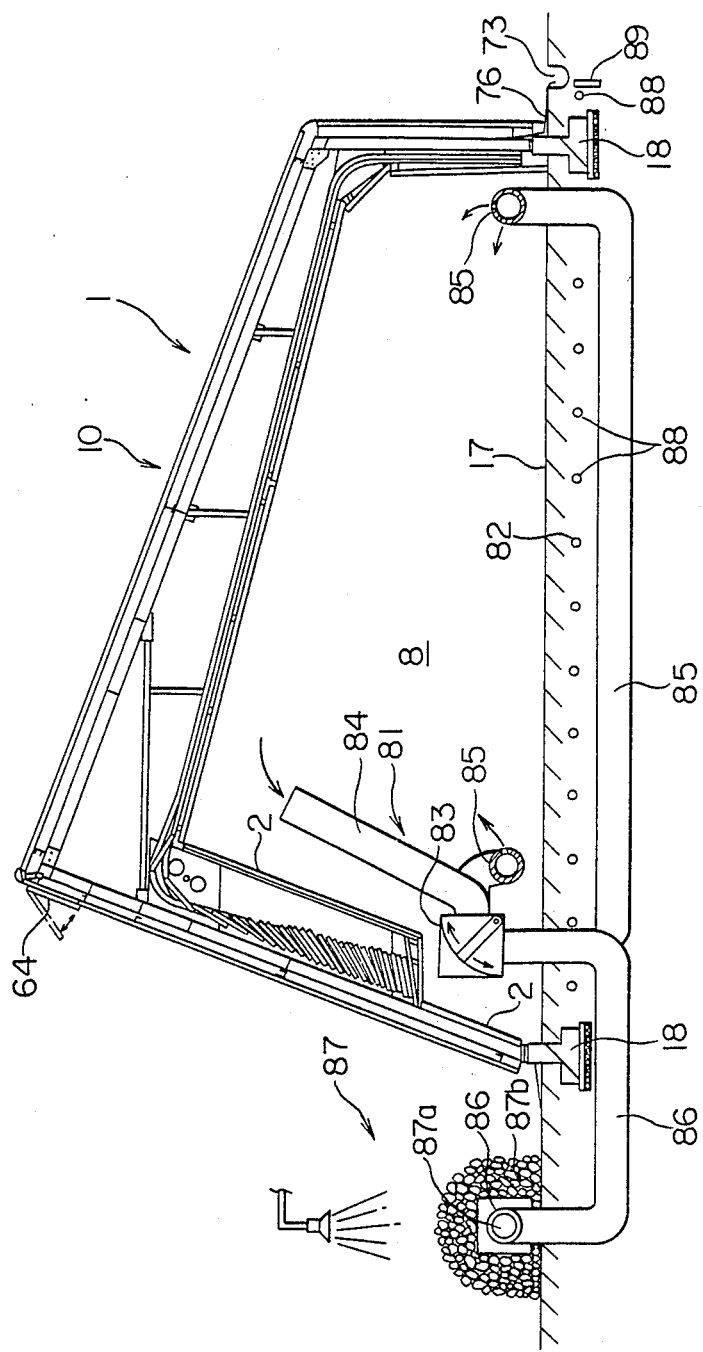
FIG. 41 is a cross-sectional view showing the arrangement of the temperature control installations.
Figure 42:
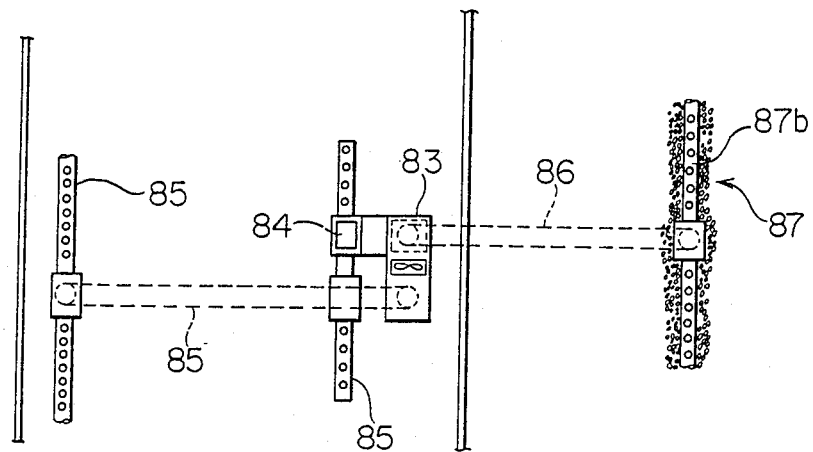
FIG. 42 is a plan showing the major part of the temperature control installations.

The fourth hothouse for cultivation 1 according to the present invention comprises temperature control installations 8. The temperature control installations 8 are composed of an air mixing apparatus 81 and a hot water ductwork 82, each of them being installed independently or together. The air mixing apparatus 81 is a conventional one which is adapted to the dimension of the hothouse 10. As shown in FIGS. 41 and 42, the air mixing apparatus 81 is composed of an air conditionner 83 comprising a fan and a damper, an intake pipe 84 installed upwardly so that it opens up high inside the hothouse, and a delivery pipe 85 comprising a number of nozzles. The intake pipe 84 takes in relatively high temperature air at the upper space of the hothouse 10. Then, the delivery pipe 85 puts it out near the ground surface. In this way, the air is circulated. As a result, there is few temperature distribution in the hothouse and the temperature is maintained at a desired value. Another intake pipe 86 can be connected to the air conditionner 83 for taking in fresh air from its external end and mixing it with the air in the hothouse using the damper. According to a preferred embodiment, water cooling means 87 are mounted at the external end of the intake pipe 86. The opening end of the intake pipe 86 is covered first with a net 87a for preventing the entrance of insects and then with, for example, sand or gravel 87b. By sprinkling water at the opening end, cold air is supplied to the inside of the hothouse 10. The arrows represent the flow of air.

Reference number 88 shown in FIG. 41 represents pipes of the hot water ductwork 82 burried in the ground in parallel with the ground surface 17. A heating medium such as groundwater, hot water from a hot spring, heated water or heated air from a supplier not shown is supplied to the pipes 88. The heating medium circulates inside the pipes 88 to heat the hothouse 10 from the ground surface 17 or, in winter, to prevent the ground surface to become cold. Preferably, these pipes 88, as shown in FIG. 40, extend beyond the basement 18 of the hothouse to the vicinity of the outdoor drain 73 so that the outdoor dtain 73 and the watercut 76 do not freeze. Reference number 89 is a heat insulator burried outside of the pipe 88.

Figure 43:
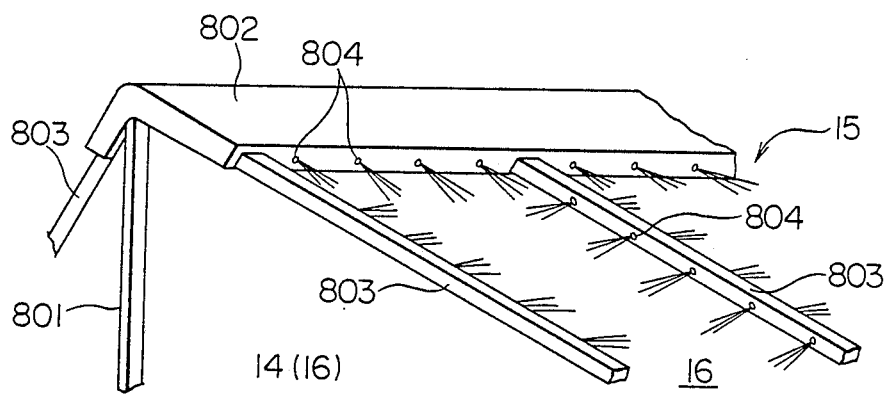
FIG. 43 is a cross-sectional view of a hothouse for cultivation for explaining sprinkling of water on the roof.

FIG. 43 shows an embodiment of the temperature control installations 8 mounted on the surface of the roof 15, that is, a sprinkler 80 on the surface of the roof 15. The surface of the roof 15 of the hothouse 10 must be large for receiving much sunlight, but at the same time the roof must be provided with provision against snow in winter. According to the present invention, hollow members are employed as a frame for the roof so that they communicate each other by connecting them in assembly. By supplying, for example, hot water inside of the connected hollow members and sprinkling it over the surface of the roof, one can melt snow at a desired time.

In FIG. 43, 801 is a post on the side of the gable, 802 is a ridge, and 803 is a stopper of the sheet 16 corresponding to a roof tile fixing bar. The ridge 802 and the stopper 803 communicate each other, the ridge 802 being a header. The ridge 802 has a number of injection nozzles 804, which are supported by the post 801, for sprinkling hot water over the sheet 16 on the surface of the roof 15.

Figure 44:
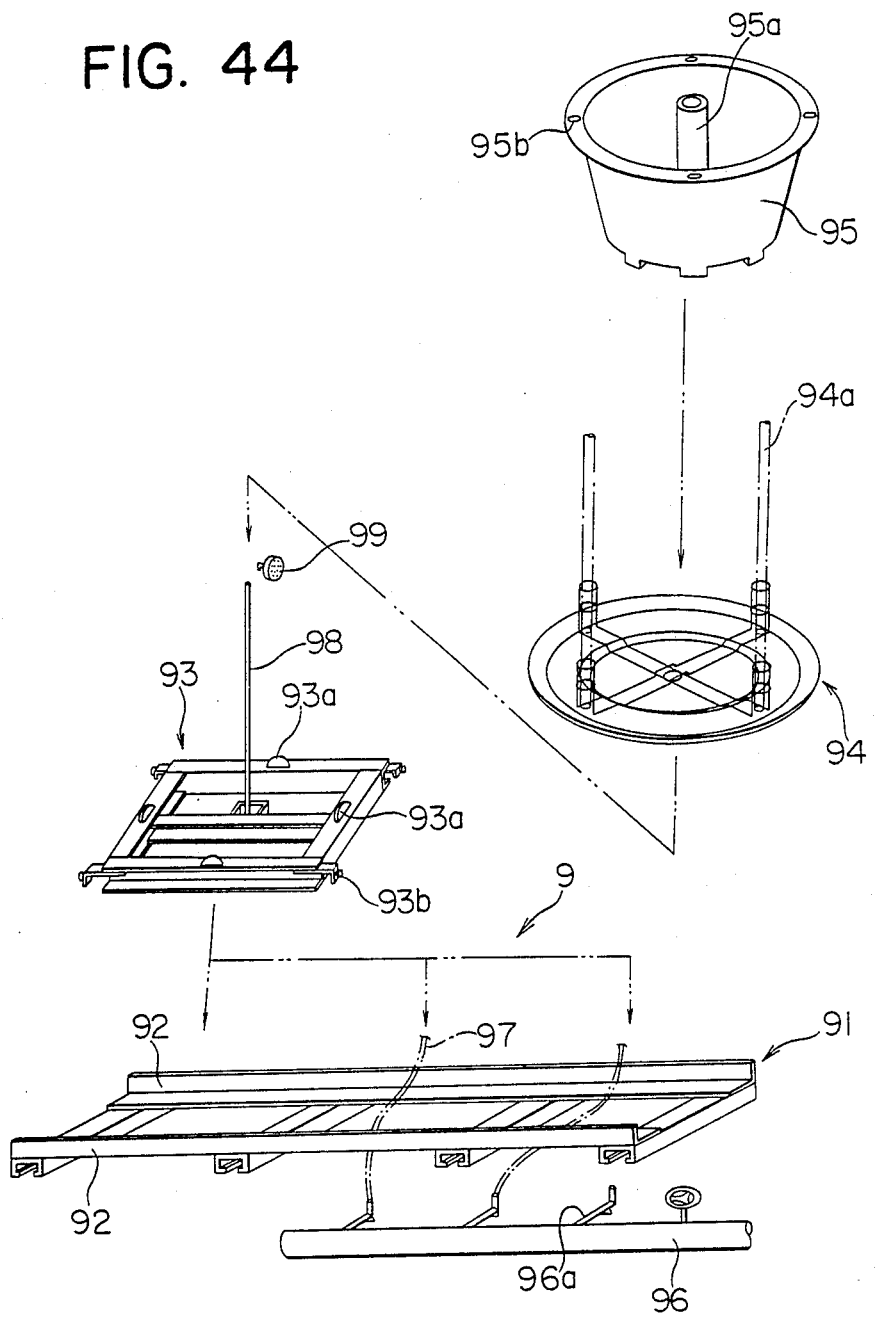
FIG. 44 is an exploded perspective view showing the arrangement of flowerpot means for cultivation.
Figure 45:
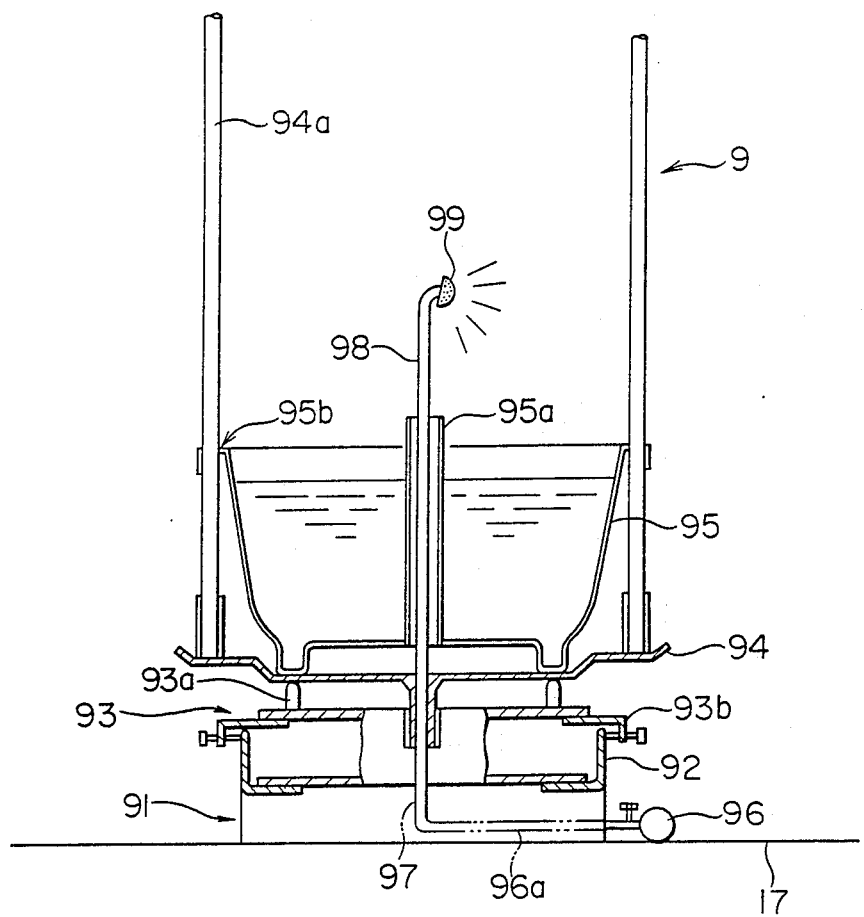
FIG. 45 is a detailed cross-sectional view of the flowerpot means for cultivation in FIG. 44.

Next, the fifth invention is explained. FIGS. 44 and 45 show an embodiment of a flowerpot device 9 for cultivation which is suitable for using inside of the hothouse for cultivation 1 of the present invention. FIG. 44 is an exploded perspective view of the flowerpot device 9, and FIG. 45 is its cross-sectional view. The flowerpot device 9 is composed of a long base 91 installed on the ground surface 17, a pair of rails 92 laid thereon along the longitudinal direction, transfer tables 93 moving freely on the rails 92, turn tables 94 carried by each transfer table 93 and flowerpots 95. A water supplier 96 is also equipped separately along the base 91. The main pipe of the water supplier 96 is provided with a number of branched pipes 96a, which are connected to hoses 97. Each hose 97 is bended upward inside of each transfer table 93 and is connected to a water pipe 98 which is supported by the boss at the center of the turn table 94. The water pipe 98 extends upwardly along a cylinder 95a of the flowerpot 95 and ends up by a nozzle 99 for sprinkling on the plants P. Posts 94a are fixed on the turn table 94 for supporting the flowerpot 95, the post passing through the flange 95b of the flowerpot 95. The top of the posts 94a may be connected together.

On the other hand, the turn table 94 is mounted for horizontal rotation around the water pipe 98 through rollers 93a which are supported respectively by a shaft fixed to the frame of the transfer table 93. The transfer table 93 can be fixed to or removed from the rails 92 by using stoppers 93b for fixing and removing the flowerpot 95. Therefore, the plants P can be put into appropriate positions so as to be able to receive sunlight under the best conditions.

In conclusion, the present invention is not restricted to the embodiments explained above, but can be modified within the spirits of the present invention. Especially, the shutter, the control device for ventilation, the drainage, the temperature control installations, or the flowerpot device can be replaced by the corresponding conventional one within the scope of the present invention.

The basic invention and the additional inventions are constructed as explained above and each invention has a function as described above separately. Accordingly, each invention has the following effects:

(1) The first basic invention relates a hothouse for cultivation enclosed with transparent members wherein reflexion plates are provided on the northern side for reflecting the sunlight toward the soil surface inside the hothouse. Therefore, by reflecting the sunlight on the northern side of the hothouse, uniform sunshine can be supplied to the plants for cultivation.

(2) The second basic invention relates to a hothouse for cultivation enclosed with transparent members, wherein a shutter, which can be opened and closed freely, is provided on the top of the hothouse so that the hothouse is switchable between two types of hothouses which are a hothouse composed only of the transparent members and a double hothouse comprising a heat insulation space between the shutter completely closed and the transparent members. Therefore, the heat of the sunshine absorbed in the day is kept in the hothouse without being dissipated during the night owing to the shutter which forms the heat insulation space.

(3) When these two inventions are combined, the sunlight can be more effectively utilized through the combined effect of the effective radiation of the sunlight in the day and the heat keeping during the night.

(4) The shutter is opened and closed freely between the closed position near the ceiling surface and the opened position where the shutter is received in the room on the northern side which comprises a reflexion surface. Therefore, the structure is quite adapted for forming the heat insulation space although the shutter curtain which is composed of a number of slats is used. In addition, the structure of the bending portion at the top constitutes an improvement of the structure of a shutter.

(5) As an element which constitutes the guide rail assembly of the shutter, a single type guide rail can be used. The branched guide member used for the guide rail assembly is an excellent member.

The combination of the above-mentioned basic inventions comprises a variety of installations and therefore the sunlight can be more effectively utilized in the hothouse.

(6) The hothouse for cultivation according to the present invention is equipped with installations for ventilation in the hothouse. Therefore, it is possible not only the temperature control but also the control of humidity of the inside of the hothouse, thereby maintaining the suitable environment for the plants for cultivation.

(7) The hothouse for cultivation according to the present invention is equipped with drainage and the drainage is realized by providing a water receiving drain on the lower surface of each slat and by extending the drain toward a conduit along a guide rail so that condensed water on the lower surface of a shutter curtain is drained. Therefore, the condensed water drops do not fall on the plants from above.

(8) The hothouse for cultivation according to the present invention is equipped with temperature control installations. Therefore, only by installing conventional mechanical installations, the inside temperature of the hothouse can be controlled and the conditions for growing the plants can be maintained at an optimally controlled state.

(9) The hothouse for cultivation according to the present invention is equipped with a flowerpot device. Therefore, sunshine conditions for the flowerpot in the hothouse can be improved and one can make effective use of the sunlight in the hothouse.

(10) Each of the additional inventions disclosed in the present specification contributes even separately to a variety of industries.

INDUSTRIAL APPLICABILITY

The hothouse for cultivation according to the present invention relates especially to a hothouse for cultivation enclosed with transparent members, wherein reflexion plates are provided on the northern side for reflecting the sunlight toward the soil surface inside the hothouse, and also to a hothouse enclosed with transparent members, wherein the hothouse comprises a shutter which can be opened and closed freely, and is switchable between two types of hothouses which are a hothouse composed only of the transparent members and a double hothouse comprising a heat insulation space between the shutter completely closed and the transparent members, so that the heat of the sunlight received by the hothouse for cultivation is most effectively used and kept in the hothouse. Accordingly, the performance of a hothouse of the prior art is remarkably improved and the utility value is especially increased. In addition, additional installations according to a variety of technologies are equipped to the the hothouse so as to increase the effectiveness of the basic inventions mentioned just above and to achieve the predetermined object of each installation without remarkable increase of cost, thereby the hothouse with a lot of installations being very useful as a hothouse for cultivation and contributing to the growth of a variety of agurcultural products for the production increase and the steady supply.

What is claimed is:

1. A hothouse for cultivation enclosed with transparent members, said hothouse comprising:
    (a) reflexion plates disposed on a northern side of said hothouse for reflecting sunlight toward a soil surface inside the hothouse;
    (b) a shutter comprising a plurality of spaced apart slats mounted within said hothouse and substantially spaced from and separated from the transparent members at the top of the hothouse for forming a heat insulation space, said heat insulation space substantially defined at its upper surface by the transparent members at the top of the hothouse and at its lower surface by the shutter;
    (c) means for opening and closing said shutter, so that when opening and closing means have said shutter in an open position, said hothouse is demarcated solely by the transparent members and the heat insulation space is absent, and when said opening and closing means have said shutter in a closed position, said hothouse is divided and is further comprised of the heat insulation space which is positioned at the upper portion of said hothouse; and
    (d) a means to partially close said shutter such that when said shutter is partially closed, spaces are present between the slats which allow for heat and light communication between a space above and a space below the shutter.

2. A hothouse for cultivation enclosed with transparent members, said hothouse comprising:
    a shutter located in an upper space of said hothouse comprising a plurality of approximately rectangular slats having long edges, short edges and flat sides, at least one guide rail and at least one drive chain, wherein said guide rail and drive chain permit serial movement of the slats with the long edges of said slats being substantially parallel, said slats being arranged serially in a single row and connected to said drive chain such that the long edges of said slats are spaced apart from the long edges of adjacent slats;
    a means to open, partially close and completely close said shutter by causing said drive chain and said slats to be moved relative to said guide rail, whereby the shutter is partially closed when spaces are present between the slats which allow for heat and light communication between a space above and a space below the shutter, said shutter is completely closed when said long edges of said slats abut so that no spaces are present between said slats, said shutter is open when said slats are stacked with the flat sides of the slats being adjacent, wherein by opening and completely closing the shutter, the hothouse can be converted between a state where its interior space is defined by the transparent members only, and a state where it has a heat insulation space formed between the closed shutter and the transparent members located above the shutter.

3. The hothouse for cultivation as claimed in claim 2, further comprising:
a guide rail having a vertical receptional rail portion located on a southern side of said hothouse for cultivation, a ceiling portion located below said roof, and a reception room located on a northern side of the hothouse which receives the slats when the shutter is open.

4. A hothouse for cultivation as claimed in claim 3, wherein said reflexion plates are disposed on a southern portion of said reception room.

5. A hothouse for cultivation enclosed with transparent members located at a roof and at sides of said hothouse, said hothouse comprising;
reflexion plates disposed on a northern side of said hothouse for reflecting the sunlight toward a soil surface inside the hothouse;
a shutter located in an upper space of said hothouse comprised of a series of rectangular slats having long edges, short edges and flat sides, at least one guide rail, and at least one drive chain wherein said guide rail and drive chain permit serial movement of the slats with the long edges of said slats being substantially parallel, said slats being connected in a single row to said drive chain such that the long edges of said slats are spaced apart from the long edges of adjacent slats;
a means to open, partially close and completely close said shutter by causing said drive chain and said slats to be moved relative to said guide rail, whereby the shutter is partially closed when spaces are present between the slats which allow for heat and light communication between a space above and a space below the shutter, said shutter is completely closed when said long edges of said slats abut so that no spaces are present between said slats, said shutter is open when said slats are stacked with the flat sides of the slats adjacent, wherein by opening and completely closing the shutter, the hothouse can be converted between a state where its interior space is defined by the transparent members only, and a state where it has a heat insulation space formed between the shutter and the transparent members located above the shutter.

6. The hothouse for cultivation as claimed in claim 5, wherein the reflexion plate is inclined so that the angle of incidence of the reflected light with respect to the soil surface is large than the angle of incidence of the sunlight.

7. The hothouse for cultivation as claimed in claim 5, wherein the reflexion plate is inclined with the angle of the inclination not smaller than the angle of elevation of the sun at the place where the hothouse for cultivation is installed.

8. The hothouse for cultivation as claimed in claim 5, wherein each of the slats is provided with reflectors at least on the surface facing to the inside of the hothouse for cultivation.

9. The hothouse for cultivation as claimed in claim 5, wherein the guide rail assembly of the shutter is composed of reception rails and guide rails comprising an inside rail and an outside rail, the reception rails spreading out downwardly for receiving the slats in an accumulated state.

10. The hothouse for cultivation as claimed in claim 5, wherein the guide rails are a single type guide rail, and the reception rails are branched through a branched guide member.

11. The hothouse for cultivation as claimed in claim 10, wherein projecting guide bars are provided on the outside surface of the slat at the front portion and at the rear portion, the guide bars being guided by the inside and the outside surfaces of the branch guide member.

12. The hothouse for cultivation as claimed in claim 5, further comprising a control system for control of the shutter, the control system including timers.

13. The hothouse for cultivation as claimed in claim 5, wherein a skylight is mounted at the upper portion of the wall on the northern side of the hothouse, the skylight forming an opening for ventilation.

14. The hothouse for cultivation as claimed in claim 13, wherein a reflexion surface is provided on the inside surface of the skylight.

15. A hothouse for cultivation as claimed in claim 5 further comprising a drainage system for draining condensed water on the lower surface of the shutter curtain.

16. A hothouse for cultivation as claimed in claim 15, wherein the drainage system is a water receiving drain provided on the lower surface of each slat at its lateral side.

17. The hothouse for cultivation as claimed in claim 15, wherein the drainage system is a conduit provided along and below the guide rails.

18. The hothouse for cultivation as claimed in claim 16, wherein the lower surface of each slat is an inclined surface toward the water receiving drain so that condensed water is guided thereto.

19. A hothouse for cultivation as claimed in claim 5 further comprising temperature control installations installed in the hothouse for controlling the inside temperature thereof.

20. The hothouse for cultivation as claimed in claim 19, wherein the temperature control installations are an air mixing installation.

21. The hothouse for cultivation as claimed in claim 19, wherein the temperature control installations are a ductwork buried under the ground surface for circulating, for example, hot water.

22. The hothouse for cultivation as claimed in claim 19, wherein the temperature control installations are a pipe system on the surface of the roof of the hothouse for sprinkling, for example, hot water.

23. A hothouse for cultivation as claimed in claim 5 further comprising a flower pot device installed inside the hothouse for dealing with flowerpots for cultivation of plants and for improving the sunshine conditions for the plants.

24. The hothouse for cultivation as claimed in claim 23, wherein the flowerpot device comprises a turn table carrying the flowerpot for free rotation.

25. The hothouse for cultivation as claimed in claim 23, wherein the flowerpot device comprises a transfer table for transferring the turn table which carries the flowerpot for free rotation.

26. The hothouse for cultivation as claimed in claim 23, wherein the flowerpot device comprises a water supplier for supplying water to each flowerpot.

27. The hothouse for cultivation as claimed in claim 26, wherein the water supplier is connected to a nozzle through a water pipe mounted as an axis for rotation for each flowerpot.

* * * * *